United States Patent [19]

Martin et al.

[11] Patent Number: 5,596,692
[45] Date of Patent: Jan. 21, 1997

[54] COMPUTER GRAPHICS

[75] Inventors: Philip D. Martin, Enfield; Kenneth A. Woodhouse, Crowthorne; Simon G. Shaw, St. Albans, all of United Kingdom

[73] Assignee: Accom, Incorporated, Menlo Park, Calif.

[21] Appl. No.: 952,509

[22] PCT Filed: Jun. 5, 1991

[86] PCT No.: PCT/GB91/00900

§ 371 Date: Jan. 26, 1993

§ 102(e) Date: Jan. 26, 1993

[87] PCT Pub. No.: WO91/19266

PCT Pub. Date: Dec. 12, 1991

[30] Foreign Application Priority Data

Jun. 8, 1990 [GB] United Kingdom .................... 9012805

[51] Int. Cl.⁶ .................................................... G06T 11/00
[52] U.S. Cl. ............................................................ 395/143
[58] Field of Search ........................... 395/143, 133–142, 395/161, 155, 275, 179

[56] References Cited

U.S. PATENT DOCUMENTS

| | | | |
|---|---|---|---|
| 4,849,910 | 7/1989 | Jacobs et al. | 395/143 X |
| 4,873,515 | 10/1989 | Dickson et al. | 395/143 |
| 4,998,214 | 3/1991 | Ryan | 395/109 |
| 5,155,813 | 10/1992 | Donoghue et al. | 395/275 |
| 5,208,904 | 5/1993 | Sasaki | 395/143 |

Primary Examiner—Almis R. Jankus
Attorney, Agent, or Firm—D'Alessandro & Ritchie

[57] ABSTRACT

A method of electrically generating a line comprising:
 a) providing first shape signals representative of at least part of a selected implement shape and second shape signals representative of a cross-sectional portion of said implement shape;
 b) determining first and second positions between which a line is to be generated; and
 c) generating said line utilizing said first shape signals in the region of said first and second points and said second shape signals for creating a segment in a region between said first and second points.

39 Claims, 11 Drawing Sheets

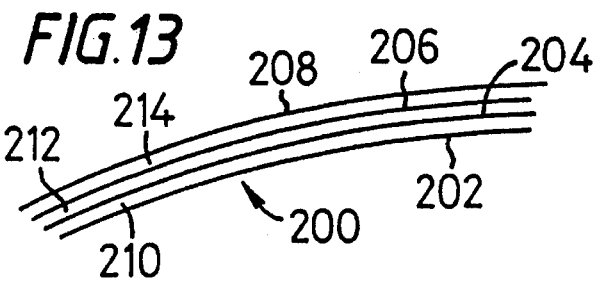
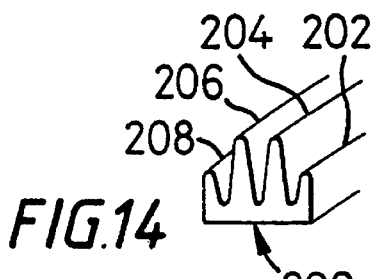
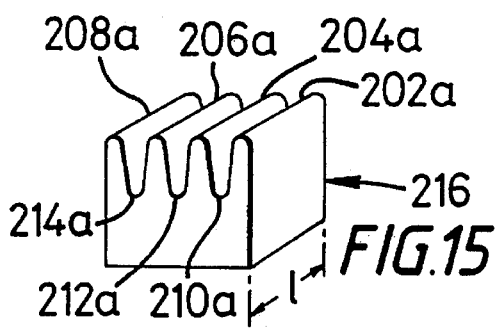
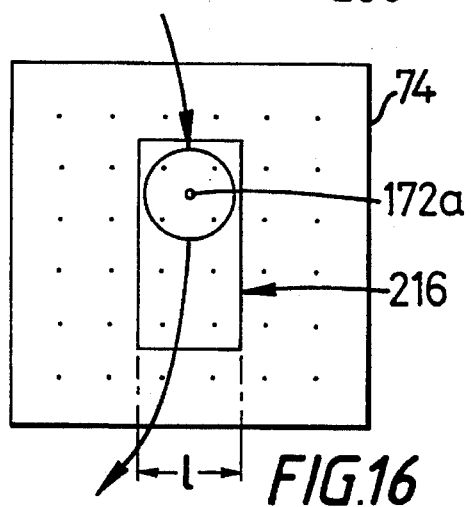
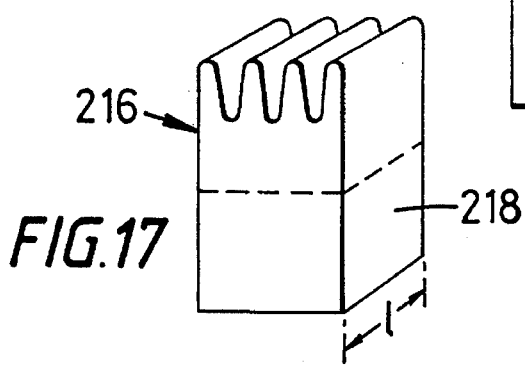
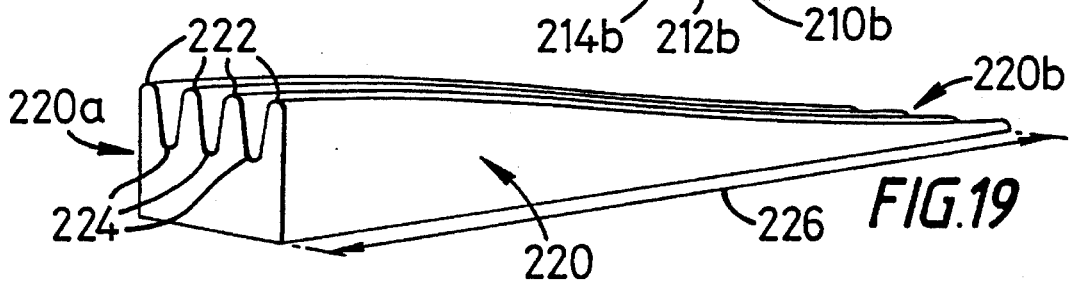
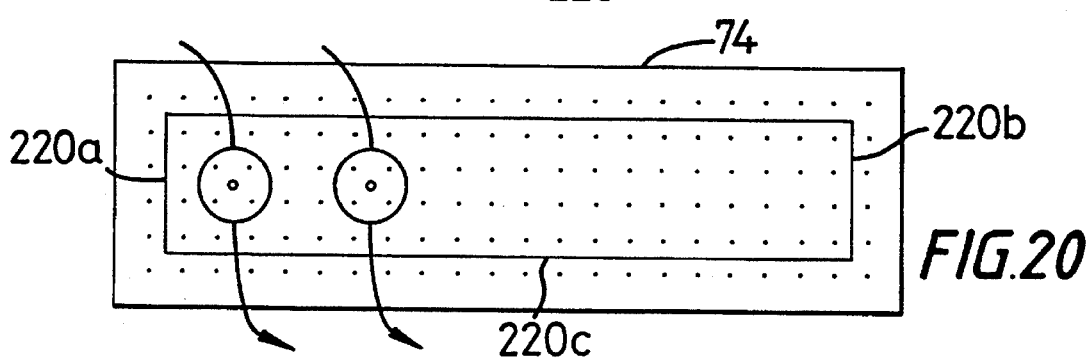

COMPUTER GRAPHICS

This invention relates to computer graphics and is particularly concerned with computer graphic systems in which lines may be drawn as in painting or sketching.

Conventional computer graphic systems comprise drafting means, such as an electronic tablet and stylus with which an artist may carry out drawing and painting movements, a computer system which receives signals from the drafting means representing the movements made by the artist, one or more frame stores for storing data representing the lines drawn or painted by the artist and output means for reading out the contents of the frame stores, for example for display on a VDU. Each frame store comprises a matrix of pixels with different pixels in the matrix corresponding to respective different positions on the tablet. Thus, placing the stylus at a particular position on the tablet designates a corresponding pixel in the frame store. In order to simulate a line produced by an artist's implement such as a particular form of paint brush or a pencil, it is known to process the patch of pixels surrounding the designated pixel by combining the data representing the colour and/or intensity of the line to be drawn with the data already in the frame store representing the background. This processing utilises a set of coefficients, of which there is a respective one for each different pixel in the patch, chosen so that the new data is combined with the old in a manner which simulates the chosen implement. Thus, as the stylus moves across the tablet, the "patch" moves across the frame store and each frame store pixel which falls beneath the patch is processed a number of times dependent upon the size of the patch and the distance moved per iteration. A problem with the above described process is that since pixel which falls beneath the patch is processed a number of times, substantial computing power is needed and the process is necessarily somewhat slow.

In one aspect, the invention alleviates this problem 20 by providing means to perform a first step in which data representing the line drawn is stored separately from data representing the background and means to perform a second step in which the stored data representing the line drawn in the background are combined.

Another problem with the prior art system described above arises due to the fact that the stylus position relative to the table is sensed at fixed time intervals. The distance between successive sensed positions of the stylus will therefore vary dependent upon the speed of movement of the stylus. The patch of pixels which is processed is, as explained, that surrounding the designated pixel in the frame store corresponding to the sensed brush position. The line which is drawn, therefore, is essentially made up of a series of overlapping patches of pixels or blobs the degree of overlap reduces as the speed of stylus movement is increased. Thus, for high stylus speeds, the line produced will be percieved as having wavey edges or appears to consist of discrete blobs of paint. To avoid this, the stylus must be moved relatively slowly.

With a view to solving this problem, a further aspect of the invention provides means to compute data representing a substantially continuous line drawn between spaced apart detected position of the drafting means and to store said computed data.

In the prior art system described above, the coefficients utilised for processing the pixels in the patch, have a constant relationship to each other after the artist has selected a particular implement. Inevitably, therefore, the line drawn does not truely represent strokes made with a real artists implement since variation arises along the stroke with a real implement, for example, due to the amount of paint remaining on the brush reducing as the stroke proceeds. One proposal for dealing with this problem has been made in the article entitled "Hairey Brushes" by Strassmann at pages 225 to 232 in the proceedings of SIGGRAPH '86, Vol. 20, No. 4, 1986. In this paper, Strassman proposes that the individual bristles of a brush should be individually represented by values which are recomputed as the stroke proceeds so as to represent the decreasing amount of paint remaining on the respective bristles of a real brush as it is drawn across paper. The problem with this proposal is that it requires substantial computing power and is, therefore, in practice relatively slow.

With a view to solving this problem, a further aspect of the invention comprises means for storing a set of data representing the texture of a stroke for different positions therealong and means for utilising data selected from said set in providing data representing a stroke drawn with an electronic drafting means. The set of texture representing data may, for example, be derived by optically scanning and digitising a stroke painted with a real artists implement or, alternatively, may be computed.

Another aspect of the invention is concerned with providing more realistic effects and special effects. In accordance with this aspect, an embodiment of the invention comprises means for sensing the angle of tilt of a drafting means and means for adjusting data in response thereto for affecting an image to be produced. Preferably, the angle of tilt is used to change the size and/or shape of a shape signal representative of the distribution of paint or other medium produced by a drafting implement. For example, the effect of tilting an air brush may be replicated.

A further aspect of the invention concerns a configuration, preferably implemented in hardware, for obtaining increased flexibility.

In accordance with one preferred embodiment of this aspect of the invention, a graphics system is provided with storage means for storing data on a pixel-by-pixel basis, means for providing output signals derived from said pixels, means for providing strength signals for combination with said output signals for adjusting the value of the output signal, and means for varying the values of the strength signals as a function of the addresses of the pixels from which the output signals are derived.

In another embodiment of this aspect of the invention, a graphics system is provided with means operable to store shape signals representative of a drafting implement, means for storing texture signals representative of texture of an image or line to be created, and means for combining the shape signals and the texture signals for producing signals from which the image may be derived.

In a further embodiment according to this aspect of the invention, a graphics system includes a graphics engine comprising means for storing shape signals representative of a drafting implement, means for storing texture signals representative of texture produced by an implement, means for providing strength signals which may vary on a pixel-by-pixel basis as said shape signals and said texture signals are read, and means for combining the shape signals with the texture signals and with the strength signals.

The invention is described further by way of example with reference to the accompanying drawings in which:

FIG. 13 to 26 are diagrams illustrating examples of operations that may be performed in accordance with the invention.

HARDWARE

Figure 1:
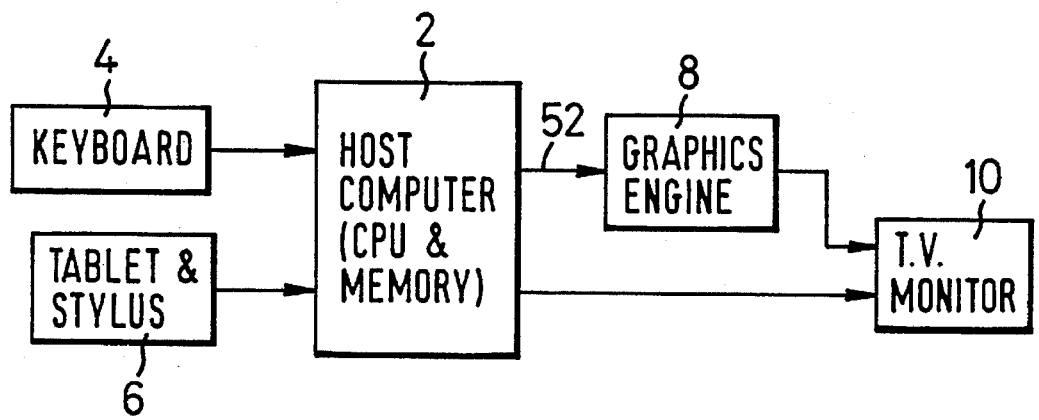
FIG. 1 is a block diagram of a computer graphics system in which the invention is embodied.

With reference to FIG. 1, a graphics computer system in accordance with the preferred embodiment of the invention comprises a general purpose host computer 2, a keyboard 4 for inputting instructions to the computer 2, an electronic tablet and stylus assembly 6 for drawing and painting and also for inputting instructions to the computer 2, a graphics engine 8 which operates under control of the computer 2 and a TV monitor 10 for displaying pictures created or modified by the graphics engine 8 in response to data from the computer 2.

As is conventional, the host computer 2 comprises a CPU and memory which may include hard disc, floppy disc, tape and RAM, for containing programmes and other data. Menus and instructions may be displayed on the monitor 10, as is conventional, for assisting in operation of the system.

Figure 2:
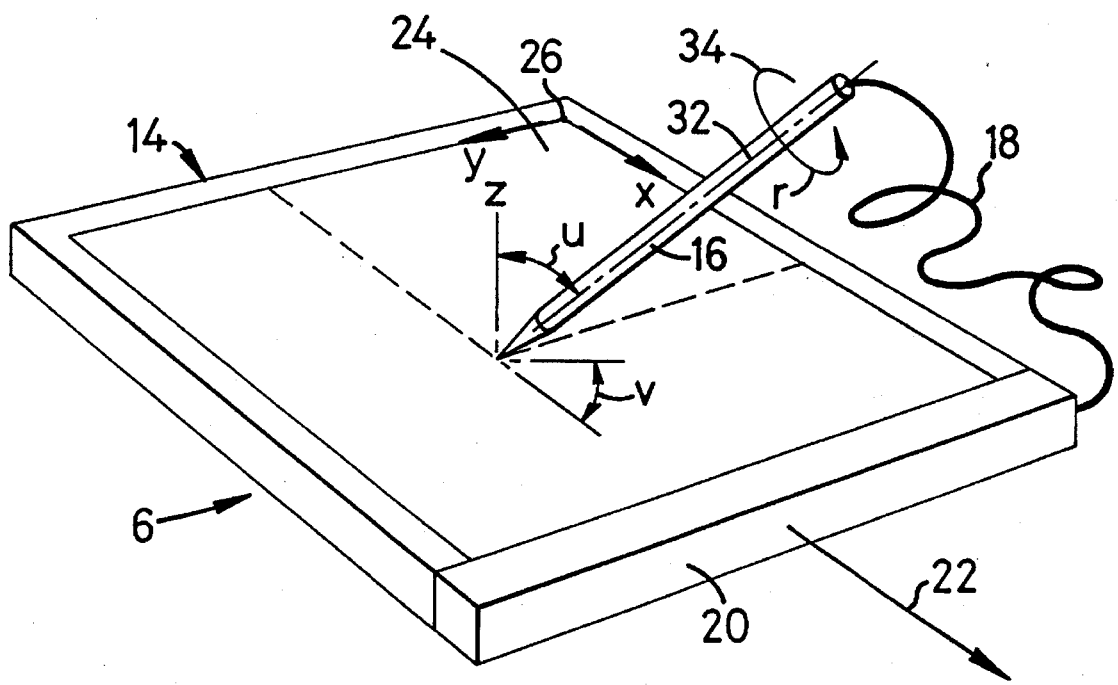
FIG. 2 is a diagrammatic perspective view of a tablet and stylus included in the system of FIG. 1.

As shown in FIG. 2, the tablet and stylus assembly 6 comprises a tablet 14, a stylus 16 connected by cable 18 to an electrical unit 20 which is in turn connected to the host computer 2 by a cable 22. Tablet 14 comprises an active area 24 over which the stylus 16 may be moved, its position at any instant being defined in terms of an XY co-ordinate system having its origin 26 at a corner of the area 24 as shown in FIG. 2. An axis perpendicular to the plane of the XY co-ordinate system is designated as the Z-axis. The electrical unit 20 outputs a number of signals to the host computer 2 representing respectively the XY co-ordinates of the position of the stylus, the stylus tip pressure, the stylus tilt as projected on the XZ plane (not shown), the stylus tilt as projected on the YZ plane (not shown), and the rotational orientation of the stylus about its own axis 32 as represented by circular arrow 34 in FIG. 2. An angle u between the Z axis and the stylus axis 32 and an angle v between the X axis and the projection of the stylus axis 32 onto the XY plane are shown in FIG. 2. The angles u and v are utilised in certain preferred embodiments of the invention to be described and are readily calculated from the above mentioned signals representative of the stylus tilt. The stylus also preferably includes an accelerometer impulse switch (not shown) for instructing control functions by shaking the stylus 16.

Tablet and stylus assemblies providing the above features are commercially available. An example is the MAX digitiser available from Terminal Display Systems (TDS) Limited of Lower Philips Road, Blackburn, BB1 5TH, England.

Figure 3:
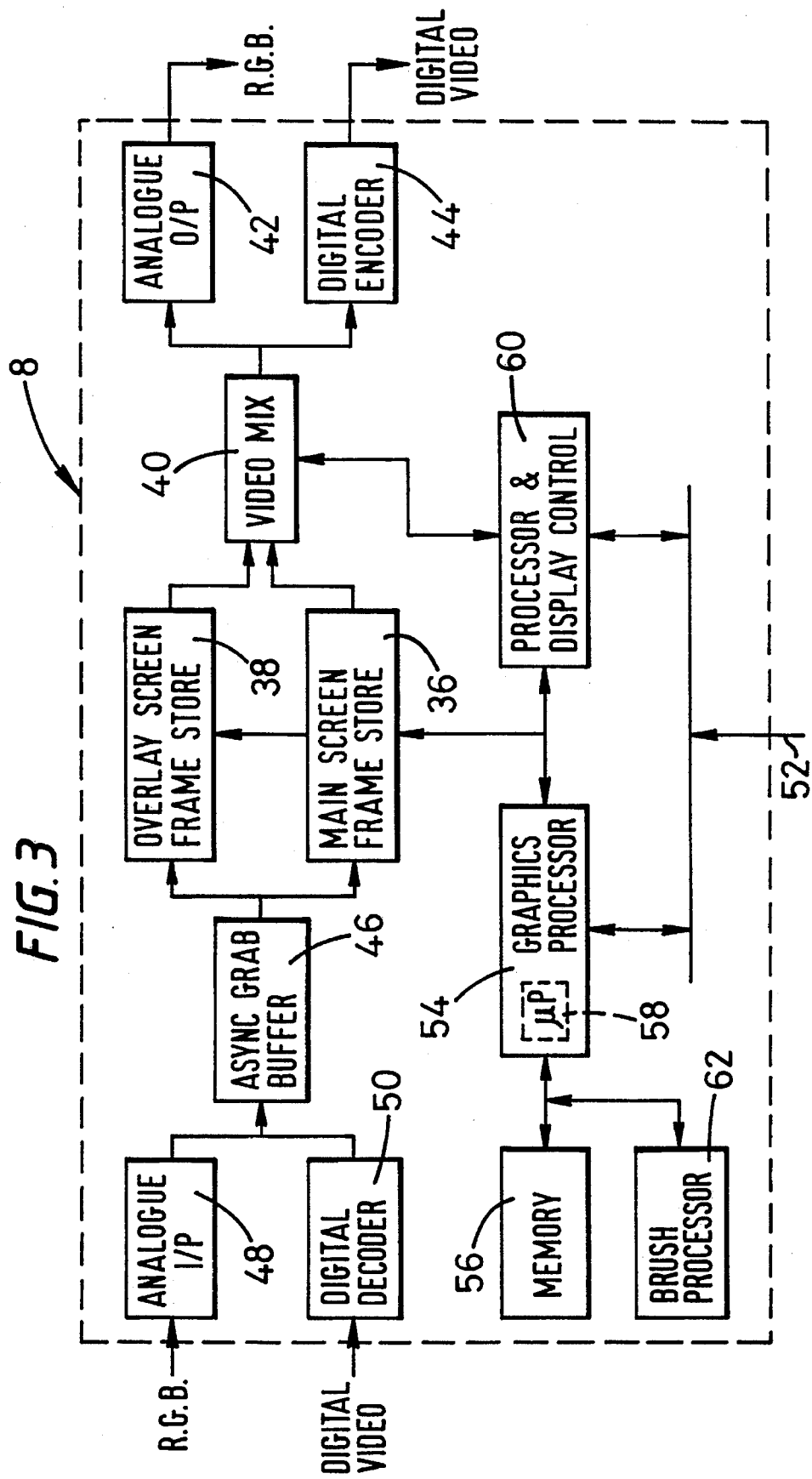
FIG. 3 is a block diagram of a graphics engine included in the system of FIG. 1.

With reference to FIG. 3, the graphics engine 8 comprises two frame stores or screen memories 36, 38, memory 36 being for storing a main image to be displayed on monitor 10 and memory 38 being for storing a further image to be overlayed on the image stored in memory 36 during display. For this purpose, the ouputs of the memories 36 and 38 are supplied to a video mixing unit 40 which outputs a video signal obtained by combining the images in the memories 36 and 38. This video signal in fact comprises three signals representing respectively the red, green and blue components of the combined image to be displayed and these signals are supplied via an output circuit 42 to the TV monitor 10. A digital encoder 44 is also provided for providing an alternative digital output when required.

An asynchronously operated input buffer 46 is provided for temporarily storing images to be supplied to the memories 36, 38 obtained from external means such as a TV camera or video tape recorder. Analogue input circuitry 48 is provided for receiving signals representing the red, green and blue components of such images and supplying them to the buffer 46. Digital decoding circuitry 50 is provided for receiving digital video signals, decoding them and supplying them in RGB format to the buffer 46.

The graphics engine 8 also includes an input 52 for receiving data from the host computer 2. The input 52 is connected to a graphics processor 54 which is in turn connected to both memories 36 and 38 and to a further memory 56. The graphics processor 54 operates in a conventional manner in response to signals from the host computer 2 for manipulating images contained in the memories 36 and 38 with the assistance of the memory 56 and for carrying out brushing functions with the aid of the tablet and stylus assembly 6. For these purposes, the graphics processor includes a microprocessor 58 and other conventional hardware which need not be described in detail. A further processor 60 is provided and is coupled to the input 52, the memories 36 and 38 and the video mixer 40 for controlling the image display functions in a conventional manner.

The hardware contained in the graphics engine 8 as so far described is conventional. An example of a system employing such hardware is the "Pastiche" system manufactured by Electronic Graphics Inc. of 1157-B Triton Drive, Foster City, Calif. 94404, U.S.A.

In accordance with an important aspect of the present invention, however, a novel brush processor 62 is provided and is connected to the graphics processor 54. Before describing the brush processor in detail the structure and operation of the memories 36 and 38 and the video mixing circuitry 40 will be further described with reference to FIG. 4.

Figure 4:
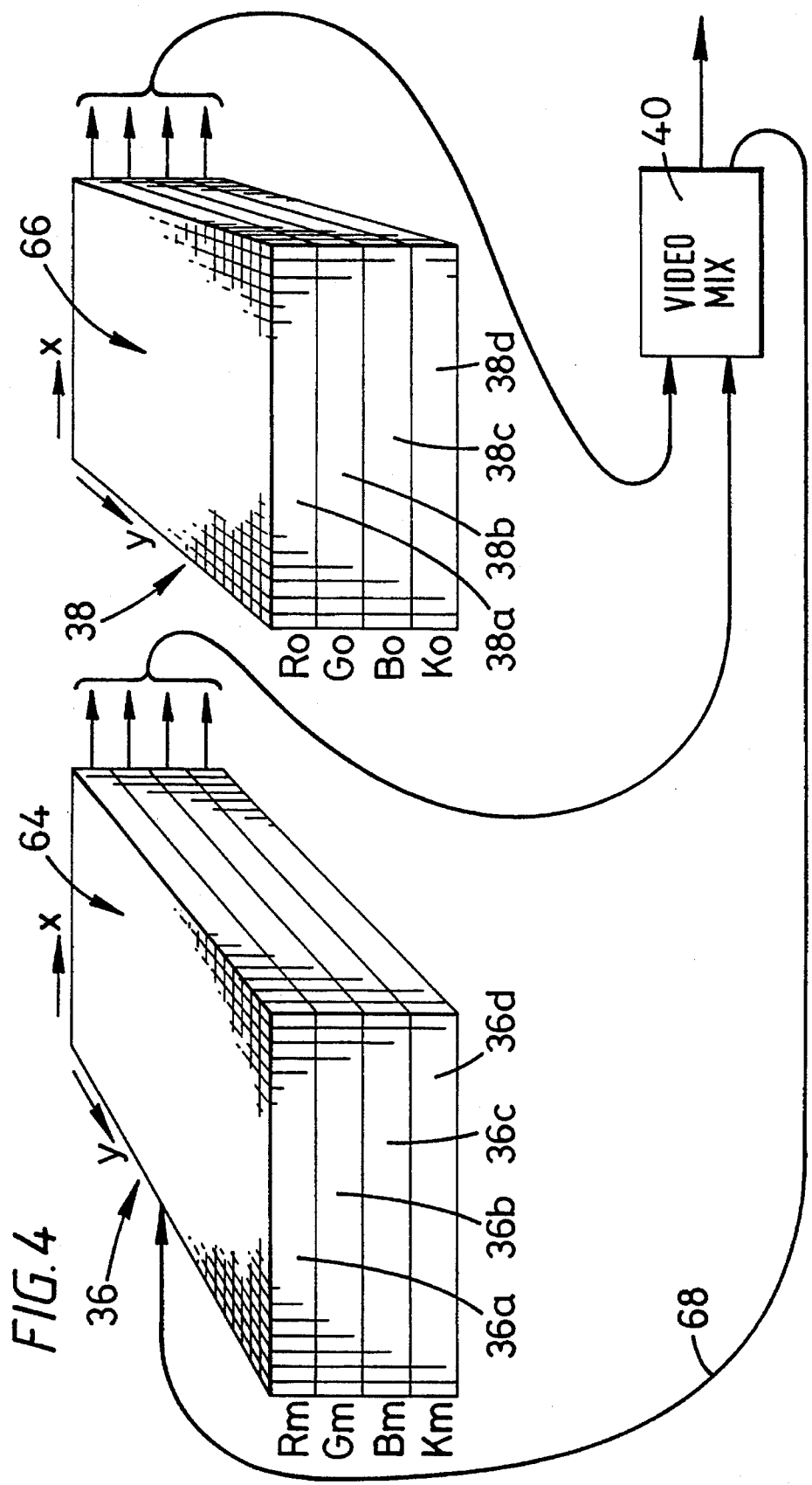
FIG. 4 is a diagrammatic-representation of part of the graphics engine of FIG. 3 showing more detail.

As shown in FIG. 4, the two memories 36, 38 are identical and comprise respective matrices of pixels diagrammatically indicated at 64 and 66. The pixels are arranged in rows and columns and there are sufficient pixels in each memory to store a complete video frame. The positions of individual pixels in each matrix may be defined in terms of an xy co-ordinate system corresponding to the XY co-ordinate system of the tablet 14. Thus, a given position of the stylus 16 on the tablet 14 will correspond to a given pixel in each of the memories 36 and 38. As is conventional, however, the tablet and stylus assembly 6 defines the stylus position to sub-pixel resolution so that the XY signals from the assembly 6 designate not only the co-ordinates of the pixel to which the stylus position corresponds but also the position of the stylus within that pixel, preferably to a resolution of at least one eighth of the size of the pixel, typically one sixteenth of the size of the pixel.

Memories 36 and 38 are arranged so that 32 bits may be stored in each pixel. The memories 36 and 38 may be regarded as organised in layers 36a to 36d and 38a to 38d (or may be physically organised into layers) with each layer containing eight bits for each pixel as indicated in FIG. 4. Thus, three of the layers 36a, 36b, 36c of the memory 36 contain respectively eight bit data representing the red, green and blue components Rm, Gm, Bm of the main image and three of the layers 38a, 38b, 38c, of the memory 38 contain respectively eight bit data representing the red, green and blue components Ro, Go, Eo of the overlay image. The fourth layers 36d, 38d of the two memories 36, 38 contain respectively eight bit data Km,Ko utilised by the video mixer ciruit 40 for determining the proportions in which the main and overlay images are combined and which of the images will be in the foreground and background respectively when displayed. Thus, the red, green and blue components of the images stored in the pixels of the memories 36 and 38 are read-out simultaneously pixel-by-pixel and combined to give red, green and blue display values Rd, Gd and Bd in accordance with the following equations:

$$Rd=Rm(1-KoKm)+RoKoKm$$

$$Gd=Gm(1-KoKm)+GoKoKm$$

$$Bd=Bm(1-KoKm)+BoKoKm$$

The images combined in this way may be displayed and, on command of the operator, the combined image may, when desired, be fed back under control of the processor 60 from the output of the video mixer 40 to the main screen memory 36, as indicated by line 68 in FIG. 4, for storage therein in place of the previous main image.

Although, in the above equations for Rd, Gd and Bd, it is assumed that Ko and Km are fractions, these fractions are in practice represented as eight bit numbers and, for convenience, the notation adopted may be such that the maximum binary value equivalent to decimal 255 is representative of the minimum value of Ko or Km. In the following description, therefore, the reference to the value Ko or Km being large should be taken as a reference to its effect on the mixing process and not to the actual numerical value stored. In other words, a relatively "large" value of Ko is a value which causes the output of the video mixer to contain a relatively large proportion of the image in memory 38 and a relatively "small" value of Ko causes the output of the video mixer to contain a relatively small proportion of the image stored in memory 38. The same comments apply to the values of Km.

Brush Processor

Figure 5:
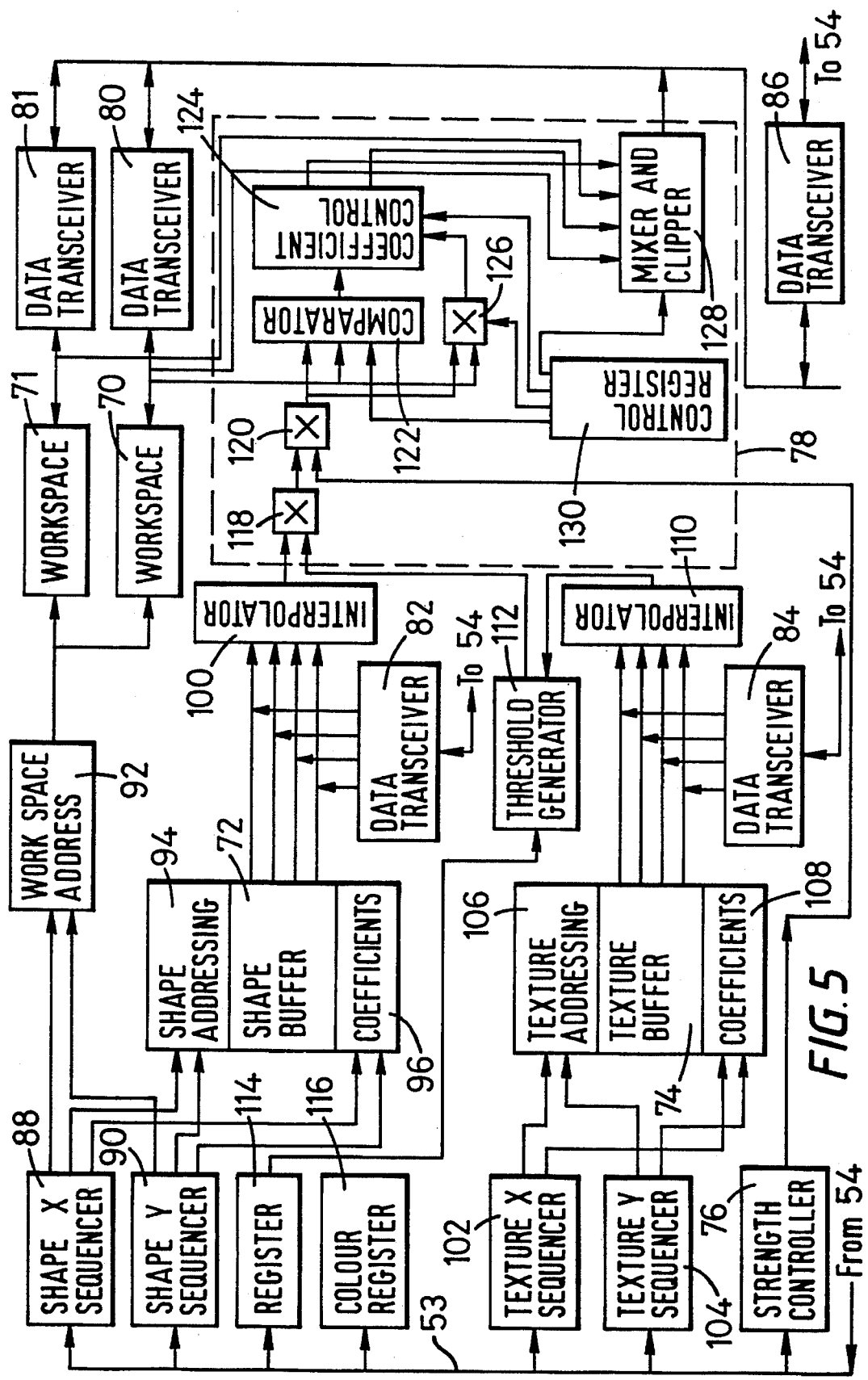
FIG. 5 is a block diagram of another part of the graphics engine shown in FIG. 3.

As shown in FIG. 5, the brush processor 62 comprises work space memories 70,71 for receiving and storing image data to be processed, a shape buffer 72 for storing data defining the shape of an implement notionally being used for drawing, a texture buffer 74 for storing data for modifying the texture of the drawn line as represented by data output from the shape buffer 72, a strength controller 76 for modifying the strength of the data derived from the shape and texture buffers 72, 74 and a data pipeline 78 for processing image data stored in work spaces 70, 71 with data derived from the shape and texture buffers 72, 74 and the strength controller 76. Data transceivers 80, 81 and 86 are provided for entering data into the work spaces 70,71 and tranceivers 82 and 84 are prvided for entering data into the buffers 72 and 74. The data transceiver 86 also outputs data from the pipeline 78. All data enters and leaves the brush processor 62 via the graphics processor 54. Accordingly, the transceivers 82, 84 and 86 of the brush processor 62 are coupled to the graphics processor 54.

Reading out of data from the work space 70 or 71 simultaneously and in synchronism with the reading out of data from the shape buffer 72 is achieved by x and y address sequencer circuits 88 and 90 which are connected to the work space memories 70, 71 through a workspace address circuit 92 and to the shape buffer 72 by a shape buffer address circuit 94. The sequencers 88, 90 are also both connected to a coefficient ROM 96 to select and supply appropriate coefficients to an interpolator 100 for performing interpolation on data output from the shape buffer 72 prior to application of that data to the pipeline 78. In the preferred embodiment, the interpolator 100 is a CMOS TMC 2246 interpolator chip and each sequencer 88,90 is a CMOS TM2301 Image Resampling Sequencer, these being available from TRW LSI Products Inc. of 4243 Campus Point Court, San Diego, Calif. 942, U.S.A.

Sequencers 102 and 104, which are similar to sequencers 88 and 90, are respectively provided for effecting the x and y addressing of data in the texture buffer 74 via an address circuit 106. The sequencers 102 and 104 are also coupled to a ROM 108 for selecting coefficients therefrom and applying these coefficients to a further interpolator 110 for performing interpolation on the data output from the texture buffer 74. The output of the interpolator 110 is supplied to the pipeline 78 via a threshold generator circuit 112 which adds an offset value, selectable by the operator, to the data from interpolator 110. A register 114 is provided for storing this offset value and a colour register 116 is provided for defining the colour of the line being drawn or painted although, as will be described, in certain modes of operation of the preferred embodiment, colour is otherwise defined. A data bus 53 coupled to the processor 54 is provided for supplying data to the sequencers 88, 90, 102, 104, the registers 114 and 116 and the strength controller 76.

The data pipeline 78 comprises multipliers 118 and 120 for multiplying together the outputs of the interpolators 100, the threshold generator 112 and the strength controller 76. Thus, in operation, the multiplier 120 outputs a series of values. These are supplied to a comparator 122 which may also receive a series of values obtained by reading the pixels of workspace 70 in turn. The output of the comparator 122 is applied to a coefficient control circuit 124. The circuit 124 is connected to the output of a multiplier 126 which multiplies together the values output by the multiplier 120 and the pixel values output from work space 70. A mixer and clipper circuit 128 outputs data to the tranceiver 86 in response to inputs from the coefficient control circuit 124 and the work spaces 70 and 71. A control register 130 is provided for applying control signals to the comparator 122, coefficient control circuit 124, multiplier 126 and mixer and clipper 128 so that these circuits can be controlled to operate in different ways, as will be subsequently explained in detail, depending upon the mode of operation of the system selected by the operator.

Preferably, the interpolators 100 and 110 output 9 bit data for accuracy, this subsequently being clipped to 8 bit data in the mixer and clipper 128. It is also preferable that the control register 130 may set the mixer and clipper 128 into modes in which the inputs to the data pipeline are added to or subtracted from each other.

Various aspects of the hardware configuration of the brush processor illustrated in FIG. 5 form an important aspect of the preferred embodiment of the invention. Various ways in which this hardware may be operated in accordance with further important aspects of the invention will now be described by way of example.

LINE CREATION

The drawing or painting of lines in accordance with a preferred aspect of the invention will first be described on the assumption that the texture buffer 74, threshold generator 112 and strength controller 76 are not used. Thus, the outputs of the threshold generator 112 and strength controller 76 are held fixed at a value of unity so that the values output by interpolator 100 are unchanged by the multipliers 118 and 120. In order to carry out painting or drawing of lines, the operator must select both the paint colour and the brush shape to be used. As is conventional, therefore, the host computer may contain a library of brush shapes and colours and contain programmes enabling the operator to select these in a conventional manner. However, in the painting and drawing process of this aspect of the invention under description, selection of the colour to be used in painting results in the pixels of the overlay memory 38 being uniformly set to the selected colour. That is to say the Ro, Go, Bo values for each pixel in the memory 38 are all set to represent the chosen colour. Also, initially, the Ko values of the pixels in the memory 38 are all set to represent zero. The colour register 116 is not used in this aspect of the invention.

Figure 6:
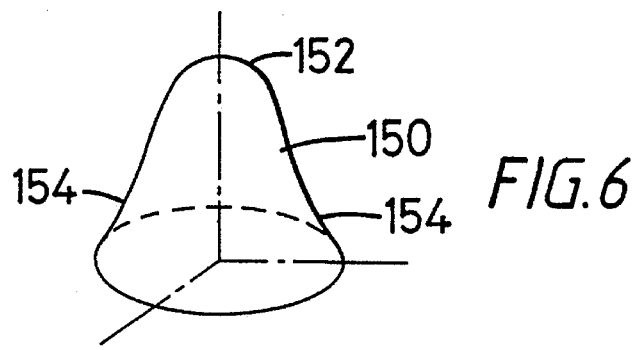
FIG. 6 is a diagram of an example of a brush shape which may be used in the system of FIGS. 1 to 5.
Figure 7:
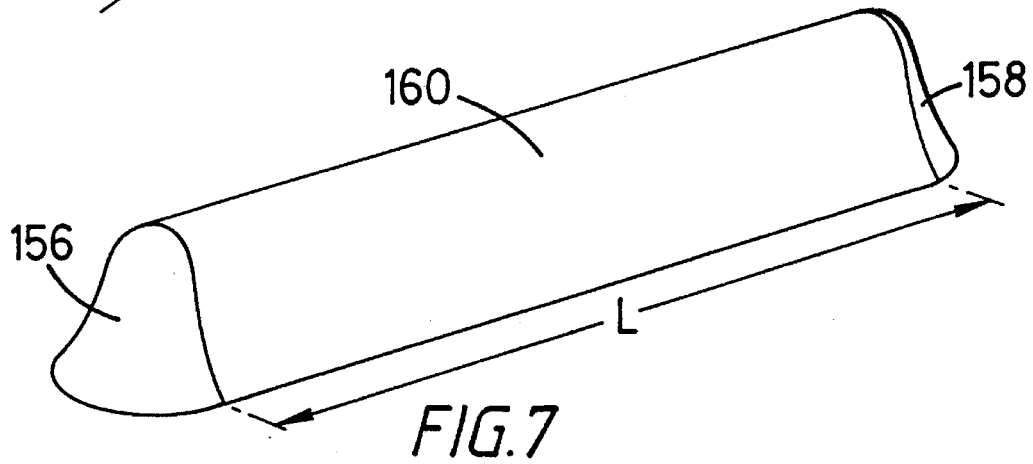
FIG. 7 illustrates diagrammatically a line drawn with a brush of the shape shown in FIG. 6.
Figure 9:
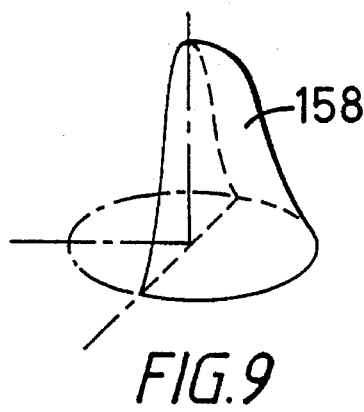
Figure 10:
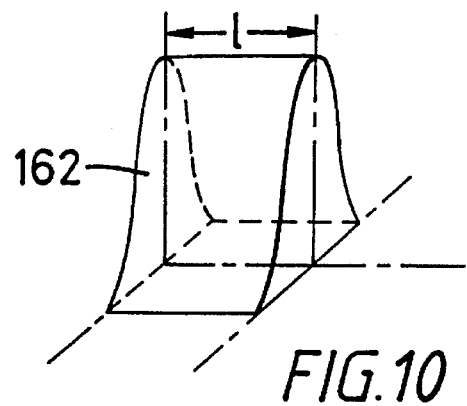

Upon selection of a brush shape, appropriate data is stored in the shape buffer 72. However, in the process under description, three sets of shape data are stored, the first representing a start segment of a line to be drawn, the second representing a cross-section of a middle segment and the third representing the end segment of the line to be drawn. By way of example, the selected brush may be of the "bell" shape shown in FIG. 6. This represents a brush which, when brought into contact with a paint receiving surface, would deposit a circular spot of paint with maximum paint being deposited at the centre of the spot and the amount of paint tailing off towards the edges. Thus, in FIG. 6 the curved three dimensional surface 120 may be considered as representing the intensity distribution of the pixels used to display the spot on monitor 10, the three dimensional surface 150 in FIG. 6 being a representation of the pixel values which, as shown, are a maximum at the centre 152 and tail off to the edges as indicated by curve portion 154. If a brush producing the distribution as represented in FIG. 6 were brought into contact with a surface to be painted, moved along a straight line and then removed from the surface, the resulting distribution of paint may be represented as shown in FIG. 7. As can be seen, the distribution shown in FIG. 7 may be considered as comprising a start segment 156 at the point where the brush is brought into contact with the surface to be painted, an end segment 158 at the point where the brush is removed from the surface to be painted and an intermediate segment 160 extending between the two segments 156 and 158. The segment 156 corresponds to half the bell shape shown in FIG. 6 and is thus as separately illustrated in FIG. 8. The segment 158 corresponds to the other half of the bell shape shown in FIG. 6 and thus is as illustrated separately in FIG. 9. The intermediate segment 160 is of uniform cross-section and, if considered as having a length L, may be considered as a succession of n segments 162 each of length 1 as illustrated separately in FIG. 10. Thus L=nl. As can be seen from examination of FIGS. 8, 9 and 10, the cross-section of the segment shown in FIG. 10 corresponds to a section through the maximum point 152 of the bell shaped surface 150 of FIG. 6. The three sets of data stored in shape buffer 72 upon selection of the brush shape shown in FIG. 6 accordingly correspond to the segments 156, 158 and 162 shown in FIGS. 8, 9 and 10 respectively.

Figure 11:
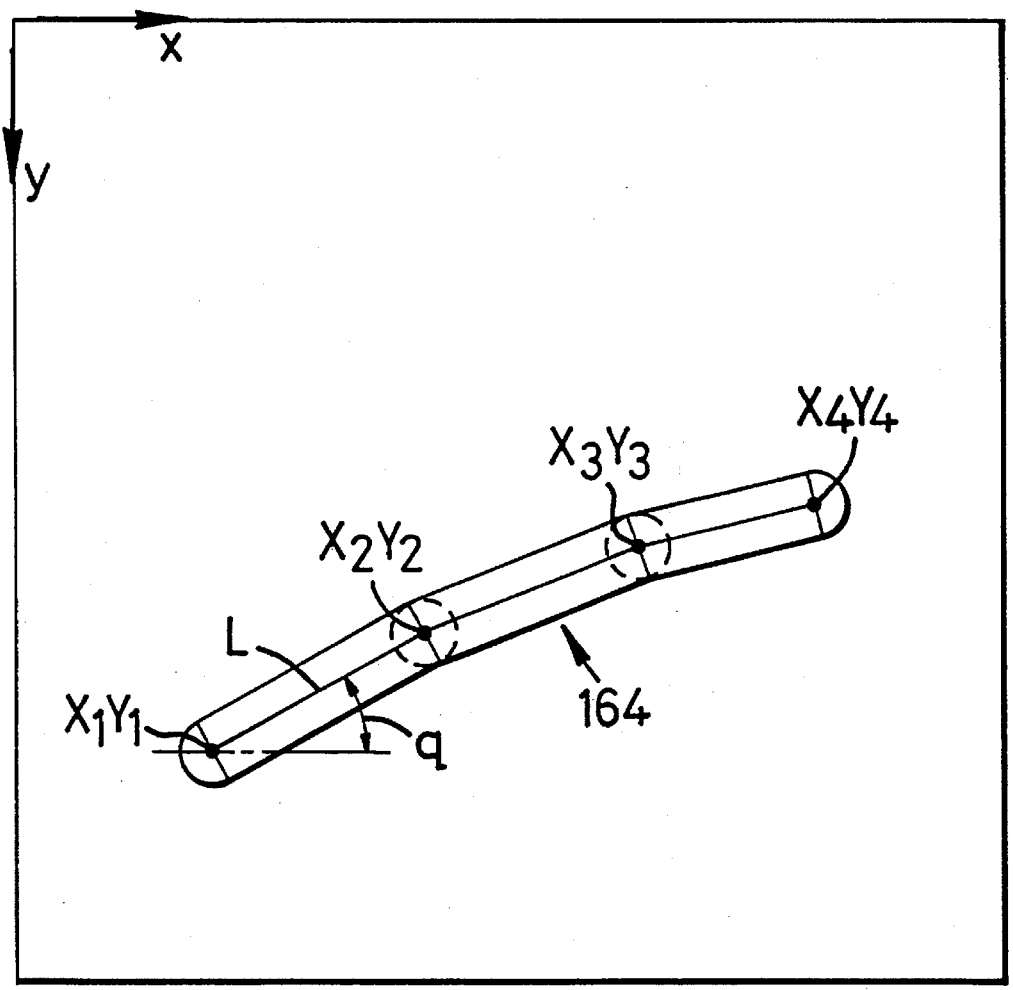
FIG. 11 is a diagram for illustrating creation of a painted line in accordance with a preferred aspect of the invention.

Having selected colour and brush shape, the operator of the system may proceed to draw lines using the tablet and stylus assembly 6. For the purposes of explanation, it will be assumed that the artist draws a line 164 as shown in FIG. 11 and that the system detects the stylus at positions X1,Y1; X2,Y2; X3,Y3 and X4,Y4. Upon detection of the stylus at each successive position, the system will draw successive straight line segments in the colour stored in memory 38 utilising the segmental shapes 156, 158 and 162 stored in shape buffer 72. This involves a rotation of the segment 156 of FIG. 8 to the correct angular orientation, a rotation and, effectively, an extrusion of the segment 162 shown in FIG. 10, and a rotation of the segment 158 of FIG. 9.

The processing carried out to achieve the above will now be described with reference to FIG. 12. The upper part of FIG. 12 shows diagrammatically a portion of the layer 38d of memory 38 containing points X1,Y1 and X2,Y2 with the corresponding segment of the line 164 drawn thereon. The middle part of FIG. 12 represents the workspace 70 with image data transferred thereto at different stages in the process. The bottom part of FIG. 12 represents the shape buffer 72 with the segmental shapes 156, 158 and 162 contained therein.

In the first step of the process, the microprocessor 58, contained in the graphics processor 54, calculates the distance L between the points X1,Y1 and X2,Y2 and the angle q which this line makes to the x axis. These calculations are as follows:

$$L=\sqrt{[(X2-X1)^2+(Y2-Y1)^2]} \qquad \text{Equation 1}$$

$$q=\arctan[(Y2-Y1)/(X2-X1)] \qquad \text{Equation 2}$$

Figure 8:
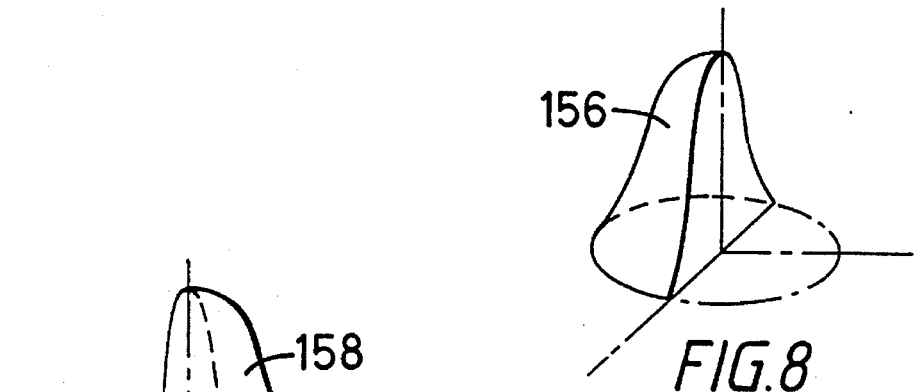
FIGS. 8 to 10 show respectively three segmental brush shape portions utilised accordance with a preferred aspect of the invention for the creation of a line as shown in FIG. 7 to simulate painting with a brush of shape shown in FIG. 6.

The graphics processor 54 also, from knowledge of the dimensions of the segment shown in FIG. 8 and the angle q through which it has to be rotated, identifies a rectangle 170 in the memory 38 surrounding point X1, Y1 and just large enough to contain the rotated segment of FIG. 8 when that segment is positioned with the centre of the full brush shape (i.e. the shape of FIG. 6) coincident with point X1,Y1. Having identified the rectangle 170, processor 54 then transfers the Ko values of the pixels therein to work space 70 in brush processor 62 as indicated by arrow 171 in FIG. 12. Under control of the X and Y shape sequencers 88, 90, the Ko values within the rectangle 170 stored in work space 70 are read out in turn in a raster scan fashion and, as each value is read out, it is compared in comparator 122 with a corresponding value derived from the shape buffer 72 and interpolator 100 under control of the sequencers 88, 90. This derivation can be understood by considering a given pixel at address X,Y within the rectangle 170 in work space memory 70. It can be shown that the corresponding address Sx,Sy within the portion of the shape buffer 72 containing the segment of FIG. 8 is:

$$Sx=(X-X1)\cos q-(Y-Y1)\sin q \qquad \text{Equation 3}$$

$$Sy=(Y-Y1)\cos q+(X-X1)\sin q \qquad \text{Equation 4}$$

These can be rewritten:

$$Sx=(Y1 \sin q-X1 \cos q)+X \cos q-Y \sin q \qquad \text{Equation 5}$$

$$Sy=-(X1 \sin q+Y1 \cos q)+X \sin q-Y \cos q \qquad \text{Equation 6}$$

Each of the sequencers 88,90 is operable to implement transformations involving rotation and/or translation utilising the following general functions:

$$Sx=A+BX+CX^2+DY+EY^2+FXY \qquad \text{Equation 7}$$

$$Sy=A'+B'X+C'X^2+D'Y+E'Y^2+F'XY \qquad \text{Equation 8}$$

where A to F and A' to F' are values specified by the user. Thus, Equations 5 and 6 are implemented to obtain the address Sx, Sy in shape buffer 72 corresponding to the given point X,Y within the rectangle 170 in workspace 70 by entering the following values into the sequencers 88,90:

$A=Y1\sin q-X1\cos q$

B=cosq

D=−sinq

A'=−(X1sinq+Y1cosq)

B'=sinq

D'=cosq

All of C, E, F, C', E' and F' are set to zero.

Usually, the values obtained for Sx and Sy will not be whole numbers and thus will not represent an exact pixel address in shape buffer 72. Usually, therefore, a point such as point 172 which is between both the rows and columns of pixels will correspond to point X,Y, the line 174 in FIG. 12 indicating this correspondence. The sequencers 88, 90 are programmed to read out, as indicated by arrow 176, from the frame buffer 72 the four pixels 173, 175, 177 and 179 nearest to the point 172 represented by the calculated Sx, Sy and to supply these to the interpolator 100, to select interpolation coefficients from the coefficient ROM 96 in dependence upon the position of the point 172 relative to the four nearest pixels 173, 175, 177 and 179 and to supply those coefficients to the interpolator 100 so that the interpolator 100 derives an interpolated pixel value for comparison in comparator 122 with the pixel value at point X, Y obtained from workspace 70 at the same time. In order to obtain a value V for comparison with the value obtained from the workspace 70, the interpolator 100 performs the following calculation:

$$V=(1-dx)(1-dy)V1+dx(1-dy)V2+(1-dx)dyV3+dxdyV4 \qquad \text{Equation 9}$$

Figure 12A:
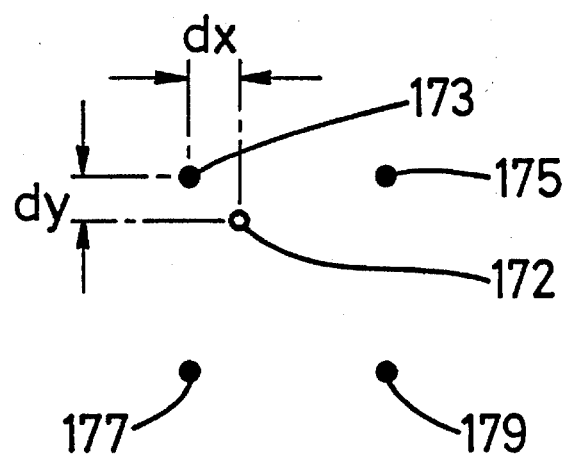
FIG. 12A shows a part of FIG. 12 to an enlarged scale.
Figure 12:
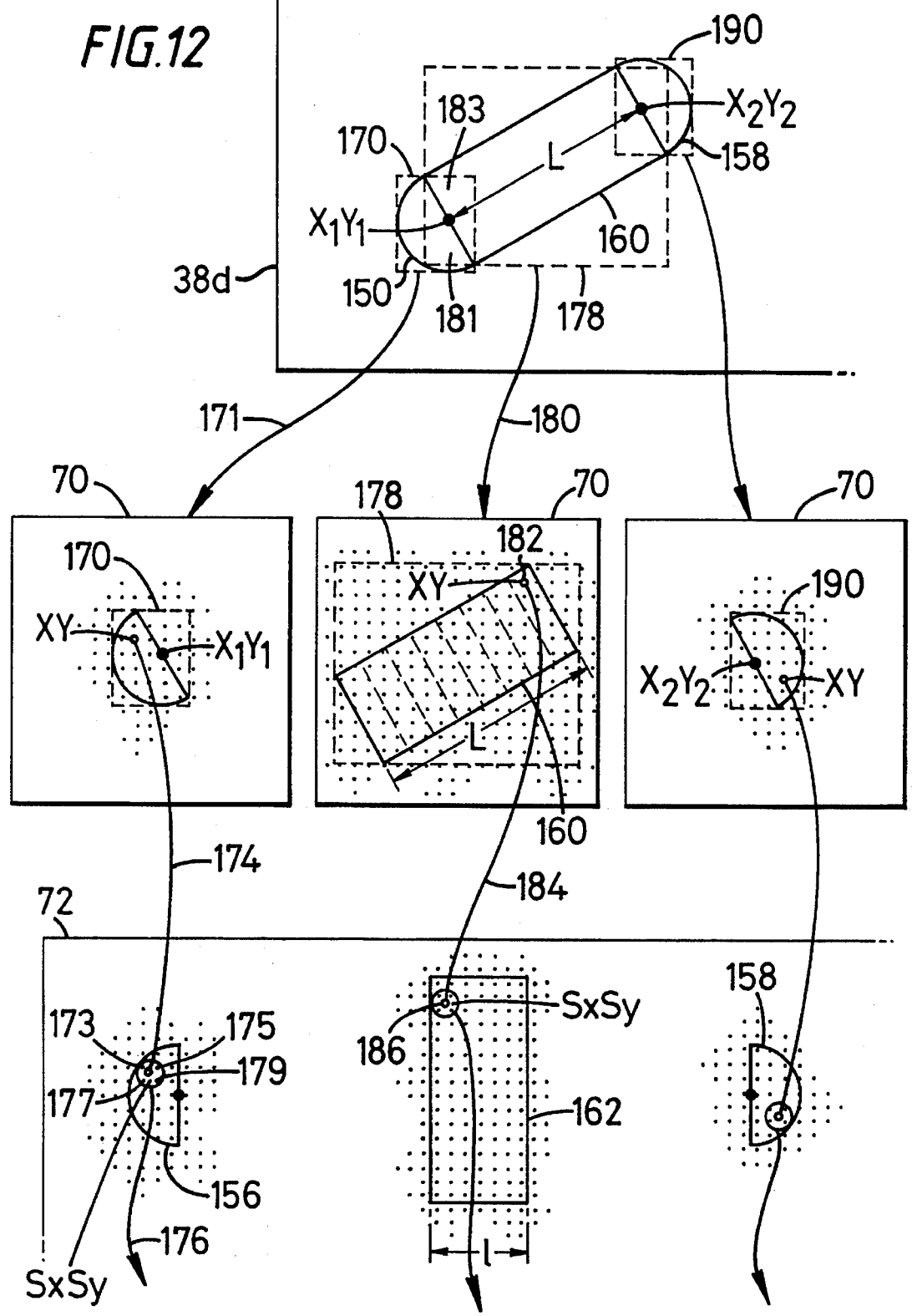
FIG. 12 is a diagram illustrating the steps performed by the system in creating a line as shown in FIG. 11.

In Equation 9, V1, V2, V3 and V4 are the values of the pixels 173, 175, 177 and 179 respectively and, as shown in FIG. 12A, dx and dy are respectively the fractional parts of the calculated co-ordinate values Sx and Sy. The coefficients supplied from the coefficient store 96 to interpolator 100 are therefore the coefficients of V1, V2, V3 and V4 of Equation 9.

Thus, in operation, after the rectangle 170 has been transferred to workspace 70, the sequencers 88, 90 operate to address each pixel in the rectangle 170 in workspace 70 in turn in raster scan fashion by sequentially incrementing the X and Y addresses of the pixels in the rectangle. As each new pixel is addressed in rectangle 170, the sequencers 88, 90 simultaneously perform Equations 5 and 6 utilising these values of X and Y to calculate the values Sx, Sy thereby to obtain the corresponding value V as described above for comparison with the value in the pixel being read from the rectangle 170. In this mode of operation, the control register 130 is preset so that the comparator 122 selects either the value V or the value of the pixel read from workspace 70 according to which is the greater and the resulting value which has been selected is returned through the graphics processor 54 to the corresponding pixel position in layer 38d of overlay memory 38. Thus, after all pixels in rectangle 170 have been processed in this way, the creation of the start segment 156 of the line between points X1, Y2 will have been completed and the middle segment 160 can then be processed.

Processing of the middle segment 160 involves, firstly, identification of a rectangle of pixels 178 in layer 38d of memory 38 just large enough to contain the middle segment 160 and transfer of the Ko values therein to workspace 70 as indicated by arrow 180 in FIG. 12. It will be seen from the upper part of FIG. 12 that there is some overlap between the rectangles 170 and 178 as indicated at 182. Thus unless special steps are taken, the pixels in the overlap area 182 will be processed twice. This can be minimised by clipping. This can be carried out in a conventional manner, which need not be described, utilising the TRW TMC2301 chips which constitute the sequencers 88,90 such that, when processing rectangle 170 those pixels in the area 181 which are not within the rotated area of the start segment shape 156 are not processed, and such that when processing the rectangle 178, those pixels in the overlap area 183 which are not within the area of the middle segment 160 are not processed.

The processing of rectangle 178 after transfer thereof to the workspace 70 is carried out in a similar manner to that described with reference to rectangle 170 except that, firstly, the segment 162 representing the cross-section of the segment 162 is utilised instead of segment 156 and, secondly, since segment 162 is, in this embodiment, only a fraction of the length of segment 160, the calculations to obtain the values Sx,Sy for each address X, Y in rectangle 78 are performed in a manner to take this into account. Thus, in this case, Sx and Sy are calculated by sequencers 88, 90 utilising the following equations:

$$Sx = \frac{1}{L}(X-X1)\cos q - \frac{1}{L}(Y-Y1)\sin q \qquad \text{Equation 10}$$

$$Sy = (X-X1)\sin q + (Y-Y1)\cos q \qquad \text{Equation 11}$$

where, as previously indicated L is the length of segment 160 and 1 is the length of segment 162.

Equations 10 and 11 can be rewritten as:

$$Sx = \frac{1}{L}(Y1\sin q - X1\cos q) + \frac{1}{L}X\cos q - \frac{1}{L}Y\sin q \qquad \text{Equation 12}$$

$$Sy = -(X1\sin q + Y1\cos q) + X\sin q + Y\cos q \qquad \text{Equation 13}$$

To implement equations 12 and 13, the coefficients in Equations 7 and 8 are therefore set to the following values:

$$A = \frac{1}{L}(Y1\sin q - X1\cos q) \quad A' = -(X1\sin q + Y1\cos q)$$

$$B = \frac{1}{L}\cos q \quad B' = \sin q$$

$$D = -\frac{1}{L}\sin q \quad D' = \cos q$$

The coefficients C, C', E, E', F and F' are all set to zero.

Thus, in FIG. 12, a point such as point 182 having co-ordinates X,Y in rectangle 178 is shown by line 184 as corresponding to a point 186 having co-ordinates Sx, Sy in segment 162 in shape buffer 72. Sequencers 80, 90, identify the four nearest neighbours to point 186, read the values of these pixels out to the interpolator 100 and supply interpolation coefficients as previously described so that the interpolator may perform the interpolation of Equation 9. So that this interpolation can be performed, the length 1 of the segment 162 should be at least two pixels.

As with the segment 156, the sequencers 88, 90 address each pixel in rectangle 178 in turn in raster scan fashion and the corresponding values for comparison therewith are supplied from interpolator 100. Again, the comparator 122 selects the larger of the two values and the selected value is returned to the corresponding location XY in layer 38d of memory 38. The performance of this process for all of the pixels in rectangle 178 may be regarded as a rotation and translation of segment 162 to each successive position along segment 160 or alternatively may be regarded as an extrusion of segment 162 from point X1,Y1 to point X2,Y2.

After completion of the processing of rectangle 178, a rectangle 190 just sufficiently large to contain the end segment 158 is identified in memory 38 with the segement 158 rotated and positioned coincident with the centre of the brush shape at point X2,Y2, the Ko values within the rectangle 190 are transferred to workspace 70 and processing thereof with the values representing the segment 158 stored in the shape buffer 72 is performed in the manner described in relation to rectangle 140 utilising equations 5, 6 and 9. Upon completion of this process, therefore, the segments 150, 158 and 160 will have been completed. Thereafter, the next section of line 164, i.e. that extending between points X2,Y2 and X3,Y3 is drawn in exactly the same way. Although this involves overlapping of the new start section with the just calculated end section, thus involving some redundant processing, this does not affect the resulting line in view of the fact that always the larger value (in this process) is selected by the comparator 122.

From consideration of the above description and the drawings, it will be appreciated that the line 164 does not suffer from the problem that it is made up of a number of successive blobs and, furthermore, anti-aliasing is automatically achieved by the interpolation performed by interpolator 100. Display of the line 164 in the colour stored in layers 38a, 38b and 38c of memory 38 is achieved by the mixing which takes place in mixer 40 and thus the line will appear on top of an image contained in memory 36 subject to any masking due to the Km values in memory 36. Changing of the colour of the line can be easily achieved simply by replacing the current colour stored in layers 38a to 38c of memory 38 with a new colour and thus, in this way, a complete colour of a drawing made up of a number of lines such as line 164 can easily be changed.

Particularly delicate effects can be achieved since the brush shape values are not combined with the previous pixel values but the larger of the two values is written back into the frame store 38 and thus, as distinct from the conventional process, there is no "build-up" of "paint" when repeatedly drawing over the same area. Because there is no "build-up" with time, drawing and painting involving slow and careful movements of the stylus can be carried out without the slow movement resulting in increased deposition or build-up of "paint". Thus, delicate work can be much more easily carried out than with conventional systems. Further, "paint" removal can be achieved simply by resetting the control register 130 so that it causes the comparator 122 to select the smaller of the two values presented to it from workspace 70 and interpolator 100 instead of the larger and this removal may be achieved with particularly delicate control as will subsequently be described by adjustment of the pressure of the stylus.

In addition, lines can be created at much higher speed than conventional processes because most pixels are not repeatedly processed in the line creation system according to the preferred embodiment of the invention. Further, a trade-off against speed and costs may be achieved. That is to say, for a given processing speed, cost can be substantially reduced compared to prior art systems because less computing power is required. For a given computing power, speed, as already indicated, is increased.

TEXTURE

The texture buffer 74 is adapted for storing data to represent texture, such as the texture produced by painting a line with a hairy paint brush or drawing a line with chalk. In operation, the texture data in buffer 74 is read out in synchronism with data from the shape buffer 72. The texture data is supplied to the interpolator 110 whose output is supplied to lo multiplier 118 via threshold generator 112 for multiplication with the data from interpolator 100. In this way, texture is superimposed on the brush shape stored in shape buffer 72 during painting and drawing operations. The affect of the texture data on the brush shape is variable by adjusting the threshold added or substracted in threshold generator 112. The operation of the texture buffer will be more fully understood from consideration of the following examples.

EXAMPLES 1

In this example, a streaky texture such as might be produced by a coarse bristled brush is to be superimposed on the line drawn utilising the brush shape stored in shape buffer 72 to produce a streaky line. FIG. 13 shows an example of such a line indicated by reference number 200 which, as shown, comprises four high intensity streaks 202, 204, and 208 separated from each other by three low intensity streaks 210, 212 and 214. Of course, in practice, there will normally be far more streaks produced since there will be far more bristles but the number of streaks shown in the drawings is restricted for clarity and explanation.

FIG. 14 shows a three dimensional representation of the intensity of the line and it can be seen from this figure that the intensity of the outer streaks 202 and 208 is less than that of the two central streaks 204 and 206. If it is assumed that the brush shape stored in the shape buffer 72 is as shown in FIG. 6, that is to say there is a high intensity central region and lower intensity outer region, the line of FIGS. 13 and 14 can be produced by super-imposing thereon a texture as shown in FIG. 15 comprising four peaks 202a, 204a, 206a and 208a of equal relatively high intensity with troughs 210a, 212a and 214a of equal, relatively low intensity to between the peaks. This is because multiplication of the values representing the line drawn with the shape stored in the shape buffer 72 with the values represented by the shape shown in FIG. 15 will produce the shape shown in FIG. 14. Thus, in this example, data representing the texture segment 216 of length 1 shown in FIG. 15 is stored in texture buffer 74 as illustrated in FIG. 16 which represents this shape in a manner similar to representation of the shape in buffer 72 in the lower portion of FIG. 12. The sequencers 102 and 104 which control the reading out of data from the texture buffer 74 are operated in synchronism with the sequencers 88, 90 which control the reading out of data from the shape buffer 72. Assuming for simplicity that the length 1 of the texture segment 216 and the segment 162 is equal to the radius of the brush shape, the texture segment 216 is read-out from the texture buffer 74 in precisely the same manner as, and simultaneously and synchronously with, the reading out of the segments 156, 162 and 158. That is to say simultaneously with the identification of, say, position 172 in FIG. 12, the corresponding position 172a is located in the texture buffer 74 and the four nearest pixel values 176a, 178a, 180a and 182a are identified and read-out to the interpolator 108. Simultaneoulsy, sequencers 102 and 104 read-out coefficients from the coefficient ROM 108 associated with the texture buffer and supply these to the interpolator 110 so as to obtain the correct value for the point 172a by interpolation utilising Equation 9. If the length of segment 218 were different from that described above, an appropriate modification of the equations for addressing the texture buffer would be made.

Assuming for the moment that no off-set is applied by the threshold generator 112, the output of the interpolator 110 is thus a sequence of values with which the output of interpolator 100 is multiplied in multiplier 118.

As already indicated, the function of threshold generator 112 is to add or subtract an off-set value to the values output by interpolator 110. If an off-set value is added, the shape of segment 216 is essentially changed to that shown in FIG. 17 where segment 216 is shown as on top of a block 218 representing the off-set value. The effect of this, after multiplication with the data from interpolator 100 is to produce a streaky line in which the overall brightness is increased but the contrast between the bright and dark streaks is reduced thereby effectively reducing the streakiness. In other words, the texturing is reduced.

If the threshold generator 112 is used to substract an off-set value from the output of interpolator 110, the result is that the shape 216 of the FIG. 15 is effectively reduced to that shown as 216a in FIG. 18. In this figure, it can be seen that the values of the peaks and troughs have been reduced, the value of the troughs identified as 210b, 212b and 214b being reduced almost to zero. The effect on the line which is drawn is to reduce the overall brightness but increase the streakiness. Thus, substracting an off-set from the texture, increases the texturing.

EXAMPLE 2

In certain artists implements, such as a hairy paint brush, the amount of paint on the brush decreases as the brush is used until the brush is again recharged with paint. Thus, drawing a continuous line with a paint brush will result in the line gradually getting fainter. An important preferred aspect of the invention provides a simple means for reproducing this effect. This is described with reference to FIGS. 19 and 20.

FIG. 19 shows a texture shape 220 which comprises four peaks 222 and four troughs 224 which are similar to the peaks and troughs shown in FIG. 15 but the segment 220 is substantially longer than that shown in FIG. 15, its length being indicated by the double headed arrow 226. As can be seen, the left hand end 220a of the texture shape 220 comprises relatively high intensity values whereas these values decrease gradually towards the right hand end 220b at which they approach zero in which case, as will be recognised, the height difference between the peaks 222 and troughs 224 may also gradually decrease along the length of the texture shape 220. In this way, the texture shape 220 represents the decreasing paint on a paint brush as the paint brush is used to paint a line. Data representing the texture shape 220 is stored in shape buffer 74 as shown in FIG. 20. In operation in this example, the system is arranged so that the user can perform a control function indicative of recharging his brush with paint. This may, for example, involve bringing the stylus 16 into contact with a predetermined portion (such as a corner portion) of the tablet 14, in which case several different such portions may be provided to represent a palette for selecting different colours by touching the appropriate portion with the stylus 16.

Alternatively, for example, a signal indicative of recharging the paint brush with paint may be generated by shaking the stylus 16 to activate the inertia switch previously mentioned. In any event, upon generation of the signal indicative of recharging, painting a line is carried out by reading texture data from the texture shape 220 beginning at the end 220a representing the brush fully recharged. As the line progresses, reading of the texture shape 220 progresses from left to right as shown in FIG. 20 until the right hand end 220b is reached. If at some point such as point 220c part way along the stored shape 220, the stylus is removed from the tablet and then drawing of the line resumed but without generating the recharging signal, reading of the texture shape is resumed from point 220c and again progresses to the right as shown in FIG. 20. Whenever the recharging signal is generated, however, reading of the texture shape 220 begins again at end 220a.

As with example 1, reading of the texture data is performed utilising the sequencers 102 and 104 which also output appropriate coefficients from the coefficient ROM 108 to the interpolator 110. However, the equations for addressing the texture buffer to locate points Sx', Sy' corresponding to points X, Y in the work space 70 are modified compared to the above equations for Sx and Sy as follows:

$$Sx' = Aj + (X - Xj)\cos Qj - (Y - Yj)\sin Qj \quad \text{Equation 14}$$
$$Sy' = (X - Xj)\sin Qj + (Y - Yj)\cos Qj \quad \text{Equation 15}$$
where $Ao = 0$ $$An = \sum_{j=0}^{n-1} \sqrt{[(X_{j+1} - X_j)^2 + (Y_{j+1} - Y_j)^2]}$$

and $$Qj = \arctan\left[\frac{(Y_{j+1} - Y_j)}{(X_{j+1} - X_j)}\right]$$

The term Aj whose value is calculated by the equation above for An repeatedly represents the length of the line which has been drawn since the last time the recharge signal was generated which of course corresponds to the distance moved along the texture stored in the texture buffer. If the value An exceeds the length of the stored texture, this is indicative of the implement having run out of paint and painting can only be resumed by generation of a recharged signal.

With conventional painting using a real brush and paint, it is of course possible to recharge the brush with differing amounts of paint. This may be replicated in the present invention by a modified form of recharging in which, instead of creating a recharged signal as above described which causes the texture buffer to be addressed at the left-hand end of the stored texture as illustrated in the drawings, recharged signals of different magnitude can be created to represent different positions along the texture, which different positions will represent different amounts of paint on the brush. For example, programming may be provided whereby generation of the recharge signal causes a value of An representing a position towards the right-hand end of the texture to be created, the value being reduced by, for example, increasing the pressure on the stylus, maximum stylus pressure for example causing the value of An to be reduced to zero. In this way, recharging with differing amounts of paint may be simulated.

EXAMPLE 3

This example illustrates a further effect which is achievable with the invention and which is believed to be completely new. It is described with reference to FIGS. 21 to 23.

Figure 21:
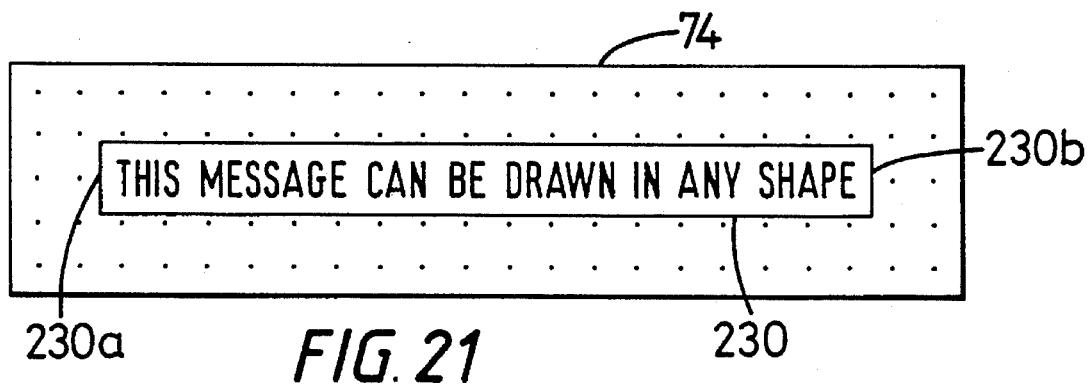

FIG. 21 illustrates the shape buffer 74 having contained therein a texture shape 230 which, instead of being used to produce true texture, is to be used to reproduce the message "THIS MESSAGE CAN BE DRAWN IN ANY SHAPE". Thus, the pixel values of the shape 230 represent this message. In order to reproduce the message, utilising a brush shape stored in shape buffer 72, the appropriate signal corresponding to the above described recharge signal is generated and the stylus then drawn across the tablet. This causes the shape 230 to be read-out beginning at the end 230a and ending at the end 230b. If, for example, the stylus is moved in an inverted horseshoe shape, the message will be drawn in such a shape as indicated by reference number 230c in FIG. 22. If, on the other hand, the stylus is moved along a somewhat S-shaped line as indicated by the reference number 230d in FIG. 23, the message is reproduced along a line of that shape. As will now be clear, the message stored in shape buffer 74 can be reproduced in a single stroke in any shape. Alternatively, it can be reproduced in segments, for example one word at a time, by removing the stylus from the tablet and then beginning drawing again at a further position without generating the recharge signal.

Further, by appropriate choice of shape in the shape buffer 72, a border might be produced above and/or below the message. Also, the contrast between the characters making up the message and the background can be adjusted by appropriate choice of values in the shape 230 and/or by variation in the off-set value provided by the threshold generator 112.

EXAMPLE 4

In Examples 2 and 3, the texture signals 220 and 230 stored in the texture buffer 74 have been progressively read from one end to the other and thereafter production of texture ceases until a recharge signal is generated. In an alternative example, the system can be arranged so that when the right-hand end 220b or 230b of the texture signals is reached, the system automatically causes reading out of the texture signals to begin again from the left-hand end as shown in the drawings. This arrangement is particularly suitable where the texture is representing an implement such as chalk, in which the amount of medium deposited does not decrease as the line is drawn. This re-reading of the texture signals is achieved simply by detecting the condition that An exceeds the length of the texture and then, in response to that detection, causing the texture to be re-read.

Figure 22:
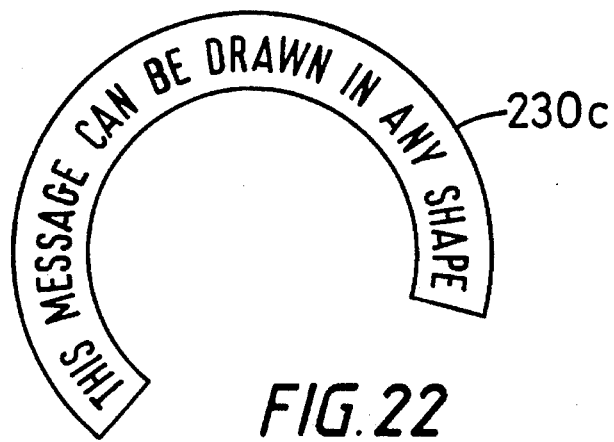
Figure 23:
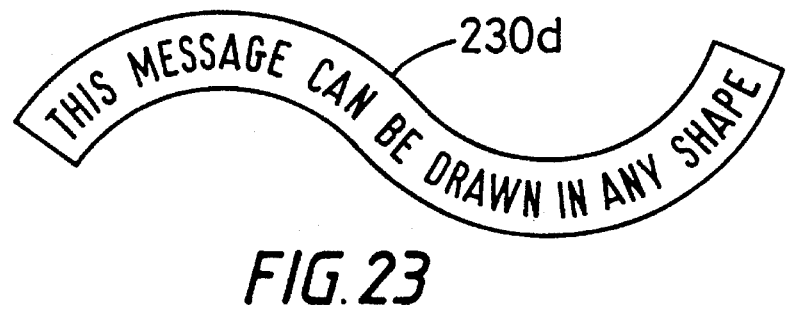

Utilizing this system, a message such as that shown in FIGS. 21 to 23 can be automatically repeatedly generated without having to generate a recharge signal manually.

STRENGTH CONTROLLER

The strength controller 76 is operable to provide a signal which may vary as a function of the co-ordinatates of the pixels being read from workspace 70 or 71 and, in the preferred embodiment, comprises a single TMC2301 CMOS Image Resampling Sequencer made by TRW LSI Products Inc. and is therefore indentical to any one of the sequencers 88, 90, 102 and 104. Accordingly, strength controller 76 is operable to implement the general equation:

$$P=A''+B''X+C''X^2+D''Y+E''Y^2+F''XY \qquad \text{Equation 16}$$

As previously, A" to F" are coefficients settable by the user and X and Y are the X,Y addresses of the pixels being read from workspace 70 and/or 71. Thus, since the output of the strength controller 76 is combined with the output from interpolator 100 by multiplier 120, the final value of the signal output by multiplier 120 may vary pixel-by-pixel dependent upon the signal from strength controller 76. This circuit configuration provides substantial advantages and enables the user to achieve a variety of effects. A number of examples will now be given.

EXAMPLE 5

In this example, the strength of the line being drawn using the line creation process described above is caused to vary as a function of the pressure applied to the tip of the stylus 6. If, by way of example, the tip pressure at points X1,Y1 and X2,Y2 shown in FIG. 12 is respectively P1 and P2, the strength controller may generate a signal whose value varies linearly along the line 160 from a value representing pressure P1 to a value representing pressure P2. It can be shown that the required pressure at any point X,Y along the line can be derived from the following equation:

$$P=a+b\ [(X-X1)\cos q+(Y-Y1)\sin q] \qquad \text{Equation 17}$$

where a=P1

$$b=\frac{P2-P2}{(X2-X1)\cos q + (Y2-Y1)\sin q}$$

Equation 17 may be rearranged as follows:

$$P=(a-b\ X1\cos q-b\ Y1\sin q)+b\ X+b\ Y \qquad \text{Equation 18}$$

Thus, in Equation 16 the coefficients are set to the following values:

A"=a−b X1 cosq−b Y1 sinq

B"=b

D"=b

C", E" and F" are set to zero.

Thus, in this way, smoothly varying intensity effects can be achieved by the operator varying the pressure applied to the stylus. If, for example, the operator starts a line with high pressure and gradually reduces it, the intensity of the line will gradually decrease with the decrease being smooth due to the interpolation which takes place between successive sensed positions of the stylus as described above. This variation may be in addition to or instead of the variation in texture achieved in example 2 above.

TILTING AIR BRUSH

An important preferred embodiment of the invention reproduces the effect of tilting an air brush. This is described with reference to FIGS. 24 to 26.

Figure 24:
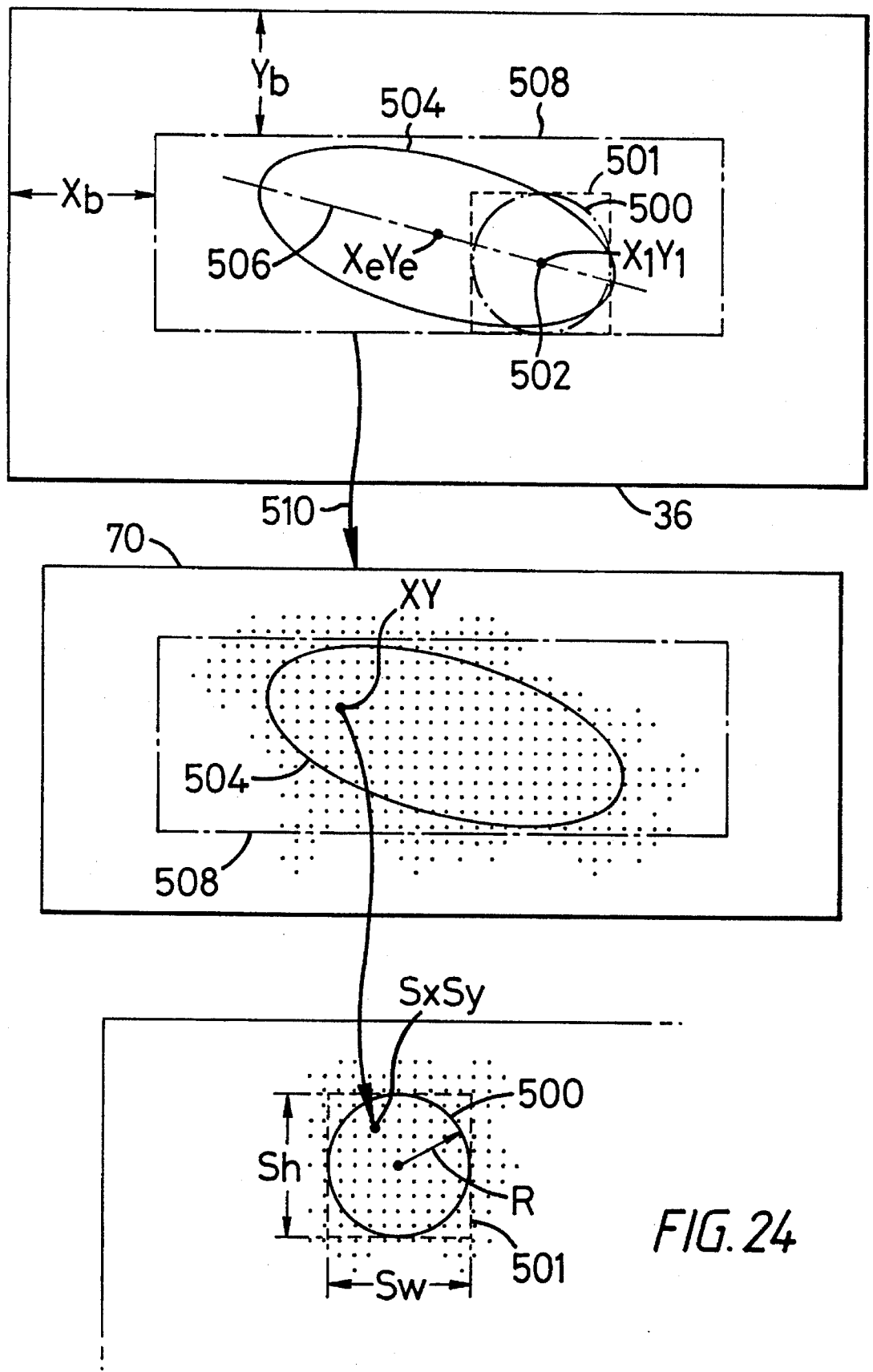

With reference to FIG. 24, the first step in the operation of reproducing a tilted air brush is to store the selected paint colour in register 116 and 10 store the basic air brush shape signals in the shape buffer 72. FIG. 24 indicates such shape signals by reference number 500. As can be seen, the shape is circular and, therefore, the arrangement is such that with the stylus 6 held perpendicular to the tablet 14, a circular blob would be produced on the TV monitor. The circular shape 500 in FIG. 24 is shown as having a radius R and contained within a rectangle 501 (in this case a square) whose width is designated as Sw and height as Sh.

The upper portion of FIG. 24 represents a portion of the main screen memory 36 and indicates a point 502 having co-ordinates X1,Y1 at which the stylus tip is detected. The circular shape 500 is shown in broken lines and, as already will be apparent, indicates the spot which would be produced if the stylus were perpendicular to the tablet. The system is arranged so that the rotational orientation of the spot about its centre varies with variation in r which is the angular orientation of the stylus about its own axis (see FIG. 1), i.e. r is the angle through which the stylus has been rotated about its own axis relative to a datum (not shown). Thus, the spot can be rotated about its own centre by rotating the stylus about its own axis but this will not be visible if the shape 500 stored in the shape buffer is symmetrical about the centre point as will normally be the case when implementing an air brush. Assuming, that the stylus is tilted, the processing according to this embodiment of the invention will change the shape of the spot produced to that approximating an ellipse 504 having a central point 506, the length of the major axis 507 of the ellipse being dependent upon the angle u (FIG. 1) and the direction thereof being dependent upon the angle v (FIG. 1).

In order to produce the elliptical shaped spot 504, the system is programmed, having detected the position X1,Y1 and the angle u, v and r, to identify a rectangle of pixels 508 which contains the elliptical shape 504. The rectangle 508 is as small as possible and derivation thereof will be described in detail later with reference to FIGS. 25 and 26. After identification of the rectangle 508, the pixel values therein are, as indicated by arrow 510, transfered to workspace 70 in the brush processor. In this example, the Rm, Bm and Gm values in memory 36 are transferred since, in this example, air brushing onto an exsiting background or picture in memory 36 is to be performed.

Having stored the rectangle 508 in workspace 70, the values therein are read out in raster scan fashion and linearly interpolated with the colour values in register 116 utilising values derived from the shape 500 stored in the shape buffer 72 as the interpolation co-efficients. The addressing of the shape buffer 72 is performed in a manner which provides the required transformation of the circle 500 into the ellipse 504. Thus, for a given pixel of address XY in the workspace 70, a corresponding address Sx,Sy is determined in the shape buffer 72 utilising the sequencers 88 and 90. More particularly, as in previous examples, the following equations are used:

$$Sx = A + Bx + dy$$

$$Sy = A' + B'x + D'y$$

The values of the co-efficients A, B, D and A', B', D' for transforming the circle to an ellipse may be calculated utilising the following equations:

$$A = \frac{Sw}{2} - [(W\cos v + H\sin v)\cos(v+r)\cos q +$$

$$(W\sin v - H\cos v)\sin(v+r)]$$

$$A' = \frac{Sh}{2} - [(W\cos v + H\sin v)\sin(v+r)\cos u -$$

$$(W\sin v - H\cos v)\cos(v+r)]$$

$$B = \cos v\cos(v+r)\cos u + \sin v\sin(v+r)$$
$$B' = \sin v\cos(v+r)\cos u - \cos v\sin(u+r)$$
$$D = \cos v\sin(v+r)\cos u - \sin v\cos(u+r)$$
$$D' = \sin v\sin(v+r)\cos u + \cos v\cos(u+r)$$

In these equations, the angles u, v and r are as shown in FIG. 2 (although, as indicated, if the shape 500 is symmetrical about its centre variation in r will not produce a visible effect) the values Sw and Sh are as shown in FIG. 24 and:

$$W = x - R\left(\frac{1}{\cos u} - 1\right)\cos v - Xb$$

$$H = y - R\left(\frac{1}{\cos u} - 1\right)\sin v - Yb$$

The interpolator 100 operates as previousl described where Xb,Yb have the meanings shown in FIG. 24.

It is also preferable that the strength controller 76 should be operated in this embodiment to cause pixels closer to the tip of the stylus to have a greater strength than those more remote therefrom. This will produce a substantially enhanced effect and is conveniently achieved by causing the signal P produced by the strength controller to be in accordance with the following equation:

$$P = a' + b'[(x - Xe)\cos v + (y - Ye)\sin v]$$

where $$a' = \frac{Po[1 + \cos u]}{2}$$

$$b' = \frac{Po\sin u}{|Xe \cdot \cos v + Ye \cdot \sin v|}$$

where Xe and Ye are the co-ordinates of the point 506 and Po is the signal indicative of stylus pressure.

In the above equations, the denominator of the equation for b' can in certain circumstances equal zero. The software is arranged so that if this condition should arise, the output of the strength controller 76 will be set to be equal to Po and will remain constant at that value so long as the condition mentioned persists.

In this way, an air brush can be replicated in a manner which is a major improvement over the prior art since not only does the shape of the spot produced vary with angle of tilt but the elongated shape produced has its center 506 shifted relative to the position of 502 of the stylus tip thus giving a realistic "feel" and, further, the strength of the pixels reduces with distance from the stylus tip giving a highly realistic effect.

Although in the example given, the circular shape has been elongated to an elliptical shape, it is also possible to expand the circular shape in other ways, for example, to create a fanning out thereof.

Thus, by way of summary, this embodiment involves identifying the rectangle 508, transferring the pixel values thereof (Rm, Gm, Bm) to the workspace 70, addressing the shape buffer 72 to expand the shape therein in dependence upon the tilt of the stylus and derive interpolation co-efficients, interpolating the selected paint colour with the pixels in rectangle 508 in workspace 70 and storing the results of the interpolation in the pixels of rectangle 508 within frame store 36.

Figure 25:
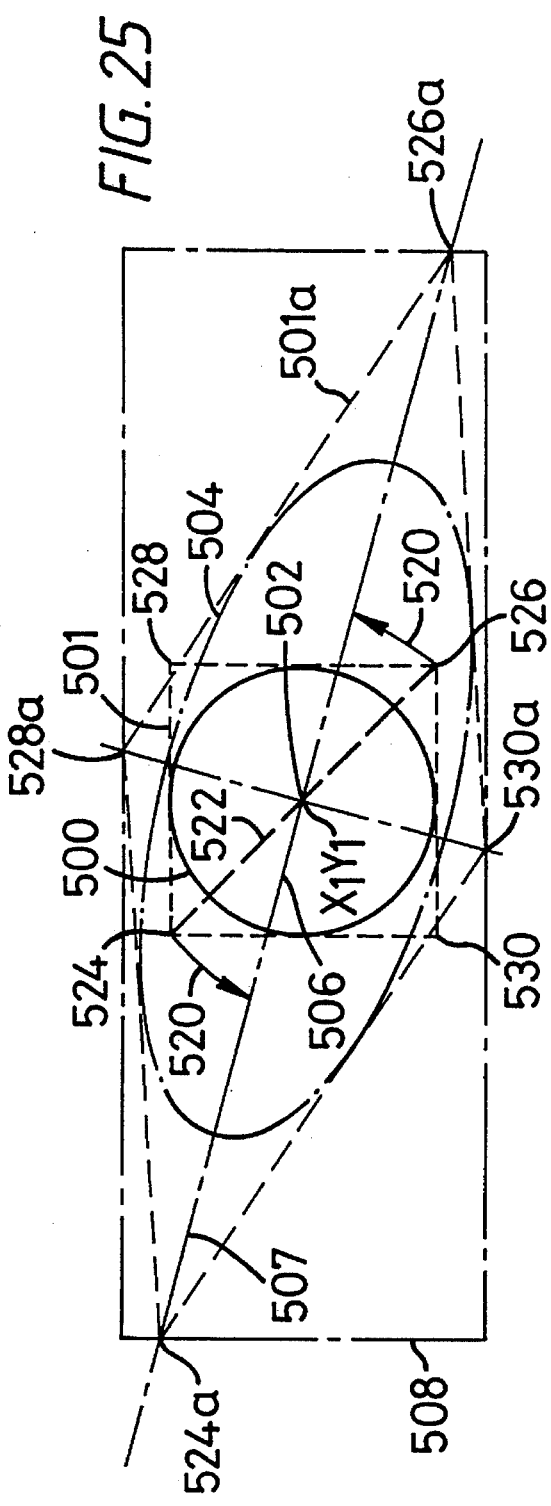
Figure 26:
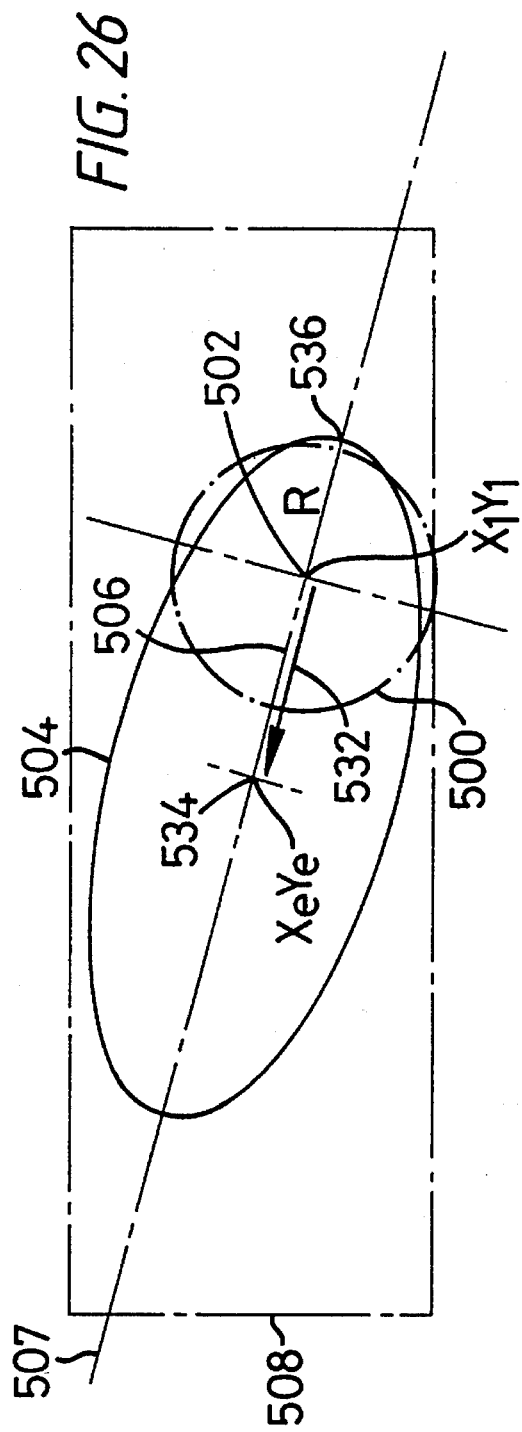

Identification of rectangle 508 in frame store 36 may be achieved as shown in FIG. 25 and 26.

FIG. 25 shows the shape 500 with its centre 502 at a pixel in memory 36 having co-ordinates X1,Y1, and the square 501 which just contains the circle 500. The line 507 (which as will be recognised also designates the major axis of the ellipse to be formed) passes through the point 502 and is at an angle v (not shown in FIG. 25) to the x axis. Identification of the rectangle 508 involves:

1. Notional rotation of the square 501 about the centre point 502 through an angle v as shown by arrows 520 to bring a diagonal 522 of the square 501 into coincidence with the line 507. This will bring corners 524 and 526 of the square into coincidence with the line 507 and corners 528 and 530 to the positions 528a and 530a.

2. Notional stretching of the reorientated square along the axis 507 by an amount dependent upon the angle u, i.e. the angle of tilt, to bring the points 524 and 526 to positions 524a and 526a. Thus, the spacing between points 524a and 526a is a function of the tilt angle and in turn the length of the major axis of the ellipse 504 which is eventually produced on the screen will increase as the angle u increases.

3. The definition of the rectangle 508 as the smallest rectangle which has its sides parallel to the x and y axes and which can contain the diamond shape 500a whose apices are the point 524a, 526a, 528a and 530a as within which the ellipse 504 is to be contained.

If the rectangle 508 were left in the position shown in FIG. 25, the point 502 which corresponds to the tip of the stylus would be positioned mid-way along the major axis 507 of the ellipse 504. Thus the effect would differ from the effect produced by a real tilted air brush in that, with a real tilted air brush, most of the elongated spot produced will be ahead of rather than behind the air brush. Thus, to improve the realism, the step shown in FIG. 26 is carried out in which the rectangle 508 is translated along the axis 507 through a distance indicated by arrow 532 to bring its centre from the position 502 having co-ordinates X1,Y1, at which the stylus tip is located, to a position 534 having the co-ordinates Xe,Ye. The distance through which the rectangle is translated may be selected by the operator or designer of the system but a preferred distance is such that the point 502 is spaced by the distance R from the point 536 where the major axis 507 intercepts the ellipse 504, where R is the radius of the circle 500. Of course, this does not have to be exact.

It should be understood that although in FIG. 25, the four points 524a, 526a, 528a and 530a at the apices of the diamond shape 500a all fall on the rectangle 508, this will not always be the case. As stated, the rectangle 508 is selected so as to be the minimum rectangle which will contain the diamond shape 500a.

Suitable equations for rotating the square 501 and expanding it to form the diamond 501a are set out below, where X,Y are the co-ordinates of the corners of the square 501 and X',Y' are the co-ordinates of the corners of the diamond 501a. The equations are:

$$X' = XM_{11} + YM_{21}$$
$$Y' = XM_{12} + YM_{22}$$

$$M_{11} = \frac{\cos(v+r)\cos v}{\cos u} = \sin(v+r)\sin v$$

$$M_{12} = \frac{\cos(u+r)\sin v}{\cos u} - \sin(v+r)\cos v$$

$$M_{21} = \frac{\sin(v+r)\cos v}{\cos u} - \cos(v+r)\sin v$$

$$M_{22} = \frac{\sin(v+r)\sin v}{\cos u} + \cos(v+r)\cos v$$

Although in the example just described, it may be assumed that the shape 500 is symmetrical about its centre, this is not necessary. The shape need not be a circle and it may, in itself, constitute a picture of an object as a result of which rotation of the stylus about its own axis will result in rotation of the image of the object about the point corresponding to the tip of the stylus. Thus, in addition to replicating a tilted air brush, the example as described with reference to FIGS. 24 to 26 may be used for producing special effects in which the shape of an image is expanded as a function of stylus tilt and rotated as a function of stylus rotation about its own axis.

VARIATIONS

Various modifications are possible within the scope of the invention.

One modification would be to the process described with reference to FIGS. 6 to 12. In a modification thereof, instead of storing the two part shapes 156 and 158, it will be possible just to store the complete shape shown in FIG. 6 and to use this both at the beginning and end of each segment 160. This would involve some redundant processing. Further, instead of storing both shapes 156 and 158, it would be possible just to store one of them in the shape buffer and to rotate that single shape to one orientation for use as the start segment and to the opposite orientation for use as the end segment.

Although, in the description of FIG. 12, the line 164 has been drawn by raster scanning the various rectangles 170, 178 and 190 corresponding to the start, middle and end segments of the line portions, it would instead be possible to write the data representing the line segments into the layer 38d of memory 38 in blocks of pixels, i.e. in "sub-rectangles".

It is preferable that the line creation process should be arranged so that if the stylus is held in the same position, the entire brush shape, rather than just a segment of it, will be written.

Although the prefered form of stylus and tablet is as described with reference to FIG. 2, other forms are possible. For example, certain embodiments of the invention can be implemented with a tablet and stylus in which there is no provision for sensing stylus tilt and/or for sensing stylus rotation about its own axis.

Although the TRW chips identified in the description of the drawings are preferred for implementation of the various circuits described, this is not essential. The various functions performed by these chips could, instead, be implemented in software, for example, or by other programmable hardware circuits.

It should be understood that the brush shape shown in FIG. 6 is just one simple example. In practice, many different brush shapes may be provided and the brush shape itself may, for example, actually constitute a picture of an object.

The shape and texture buffers illustrated in the drawings may be implemented as separate memories or, alternatively, may be implemented as different portions of a single memory which may also contain other memory space such as memory space representing the workspaces 70, 71.

If desired, a tablet and stylus could be utilized having means for sensing the distance of the stylus from the tablet and the signal representing this distance could be employed for modifying the shape of the patch of image signals produced and/or translating that shape, for example when simulating an air brush.

The above indicates only a few modifications to certain embodiments of the invention. Many others are possible.

We claim:

1. A method of generating a line so that the generated line simulates the result of a moving painting or drawing implement, said method comprising:
   a) providing first shape signals representative of at least part of a selected implement shape and second shape signals representative of a cross-sectional portion of said implement shape;
   b) determining first and second positions between which said line is to be generated; and
   c) generating said line utilising said first shape signals in a set of regions of said first and second positions and said second shape signals for creating a segment in a region between said first and second positions, and wherein the shape signals represent multiple pixels in both length and width and are rotated to match changes in the angle of said line.

2. A method according to claim 1, wherein said first shape signals are provided in two separate parts, a first part representing a start segment of said line and the second part representing an end segment of said line.

3. A method according to claim 2, wherein said first part of said first shape signals represents one half of said implement shape and said second part represents the other half of said implement shape.

4. A method according to claim 1, wherein said first shape signals represent the whole of the implement shape.

5. A method according to any of claims 1 to 4, wherein said shape signals are provided by being stored in a shape buffer and read therefrom.

6. A method according to claim 1, wherein said second shape signals represent a cross-section of short length and said cross-section is extruded to form the portion of the line in said region between said first and second positions.

7. A method according to claim 1, including
   providing signals representative of texture; and
   combining said texture signals with said shape signals, whereby a line having texture defined by said texture signals is generated.

8. A method according to claim 7, wherein said texture signals are stored in a texture buffer and read therefrom for combination with said shape signals.

9. A method according to claim 7, wherein said texture signals represent a short length of texture and wherein said short length of texture is extruded for the generation of said line.

10. A method according to claim 7, wherein said texture signals represent a long length of texture and are provided progressively along said length.

11. A method according to claim 10, wherein said length of texture simulates the running out of drawing or painting medium.

12. A method according to claim 7, wherein said combination of said texture signals with said shape signals is a multiplication.

13. A method according to claim 1, including means for adjusting the magnitude of the shape signals as they are provided as a function of the addresses of the pixels to which they relate.

14. A method according to claim 1, wherein a background on to which said line is to be drawn or painted is in a first memory, a colour with which the line is to be drawn or painted is provided in a second memory and said shape signals are provided as coefficients associated with said second memory for controlling the mixing of the colour therein with the background in the first memory.

15. A method according to claim 14, wherein, during said line generation, coefficients associated with said second memory are only replaced by new values derived from said shape signals if the values derived from the shape signals are larger than the value of the coefficients already stored.

16. A method as in claim 1, wherein said steps of providing, determining, and generating are conducted responsive to receipt of a signal from a drawing tool.

17. A method as in claim 1, wherein said steps of providing, determining, and generating are conducted responsive to a signal from a drawing tool, said signal comprising a plurality of discrete spaced apart positions of said drawing tool, whereby said method generates a substantially continuous line in response to said plurality of discrete spaced apart positions of said drawing tool.

18. A method as in claim 1, wherein said steps of providing, determining, and generating are conducted substantially in real time with regard to a signal from a drawing tool.

19. Graphics apparatus for generating a line so that the generated line simulates the result of a moving painting or drawing implement, said apparatus comprising:
  a) means for providing first shape signals representative of at least part of a selected implement shape and second shape signals representative of a multiple pixel cross-sectional portion of said selected implement shape;
  b) means for determining first and second positions between which a line is to be generated; and
  c) means for generating a line utilising said first shape signals in a region of said first and second positions and utilising said second shape signals for creating a segment in a region between said first and second positions.

20. Apparatus according to claim 19, further comprising a shape buffer for storing said first or second shape signals.

21. Apparatus according to claim 19, comprising means for providing texture signals representative of texture and for combining said texture signals with said first or second shape signals in order to generate a line having texture defined by said texture signals.

22. Apparatus according to claim 21, comprising a texture buffer for storing said texture signals.

23. Apparatus according to claim 19, comprising means for adjusting a magnitude of said first or second shape signals as they are provided in response to a set of addresses of pixels to which they relate.

24. Apparatus according to claim 19, comprising
  a first memory for storing a background onto which said line is to be drawn or painted;
  a second memory for storing a color with which the said line is to be drawn or painted; and
  means for providing said first or second shape signals as coefficients associated with said second memory for controlling the mixing of the colors therein with the background in the first memory.

25. A method of generating a line, said method comprising a) storing signals representative of a variation in first line, said variation simulating one produced by an implement of a type in which a produced line varies in response to a position along said first line; and b) generating said produced line by utilizing said stored signals in response to said position along said first line, whereby said produced line simulates said variation.

26. Apparatus for generating a line so that the generated lines simulate the result of a moving painting or drawing implement, said apparatus comprising:
  a) means for providing shape signals representative of a shape of a drawing or painting implement;
  b) means for providing texture signals representative of texture of a line generated by said drawing or painting implement; and
  c) means for combining said shape and said texture signals; and
  d) means utilizing said combined signals for generating a line having characteristics defined by both said shape and said texture signals.

27. Apparatus for generating lines so that the generated lines simulate the result of a moving painting or drawing implement, said apparatus comprising:
  a) means for storing an image, said image comprising a plurality of pixels;
  b) means for providing shape signals representative of an implement for drawing a line;
  c) means for drawing said line by altering said pixels in response to image signals derived utilizing said shape signals; and
  d) means for adjusting a magnitude of said image signals supplied to said pixels in response to a set of addresses of said pixels so as to simulate the variations which would be generated by an actual drawing or painting implement.

28. A method of generating images utilizing an electronic stylus, said method comprising
  a) carrying out drawing movements with the stylus;
  b) electronically sensing a position and tilt of the stylus;
  c) generating a patch of image signals in a location in response to the position of the stylus;
  d) adjusting a size or shape of the patch as a function of the tilt of the stylus; and
  e) altering the position of the patch in response to the tilt of the stylus.

29. A method according to claim 28, wherein said patch simulates the patch produced by a tilted air brush.

30. A method according to claim 28, including providing:
  a) first shape signals representative of at least part of a selected implement shape and second shape signals representative of a cross-sectional portion of said implement shape;
  b) determining first and second positions between which said line is to be generated; and
  c) generating said line utilising said first shape signals in a set of regions of said first and second positions and said second shape signals for creating a segment in a region between said first and second positions.

31. A method according to claim 30, wherein said first shape signals are provided in two separate parts, a first part representing a start segment of said line and the second part representing an end segment of said line.

32. A method according to claim 30 including providing signals representative of texture; and combining said texture signals with said shape signals whereby a line having texture defined by said texture signals is generated.

33. A method according to claim 28 comprising:

a storing signals representative of a variation in a first line, said variation simulating one produced by an implement of a type in which a produced line varies in response to a position along said first line; and b) generating said produced line by utilising said stored signals in response to said position along said first line, whereby said produced line simulates said variation.

34. Apparatus for producing a patch of image signals which simulates a tilted air brush, said apparatus comprising a) means for storing shape signals;

b) means for producing a group of image signals utilizing said shape signals, said group having a selected shape;

c) a stylus for defining a position of the patch;

d) means for sensing a tilt of the stylus;

e) means for modifying the shape of the group or altering the group in response to the tilt of the stylus.

35. A method of generating an image in a frame store, said method comprising a) providing a set of first signals representing a shape with which drawing or painting is to be performed;

b) providing a set of second signals, said set of second signals being representative of a sequence having a predetermined length, and said signals in said set of second signals varying in response to a parameter proportionate to said length to provide predetermined features in said image; and c) creating said image utilizing said first signals and progressively utilizing signals from said set of second signals, said first signals and said second signals being combined prior to creation of the image in the frame store.

36. A method according to claim 35, wherein said set of second signals represents texture.

37. A method according to claim 35, wherein said set of second signals contains a representation of a set of characters.

38. A method of generating a line, said method comprising:

a) providing first shape signals representative of at least part of a selected implement shape and second shape signals representative of a cross-sectional portion of said implement shape;

b) determining first and second positions between which said line is to be generated;

c) providing signals representative of texture;

d) generating said line using said first shape signals in a set of regions of said first and second positions and said second shape signals for creating a segment in a region between said first and second positions, said texture signals being combined with said shape signals whereby the line is generated having a texture defined by said texture signals wherein said texture signals represent a long length of texture and are provided progressively along said length, said length of texture simulating the running out of a drawing or painting medium.

39. A method of generating a line, said method comprising:

a) providing first shape signals representative of at least part of a selected implement shape and second shape signals representative of a cross-sectional portion of said implement shape;

b) determining first and second positions between which said line is to be generated;

c) storing a background onto which said line is to be drawn or painted in a first memory;

d) storing a color with which the line is to be drawn or painted in a second memory; and e) generating said line utilising said first shape signals in a set of regions of said first and second positions and said second shape signals for creating a segment in a region between said first and second positions, said shape signals being provided as coefficients associated with said second memory for controlling the mixing of the color therein with the background in the first memory, wherein during said line generation, coefficients associated with said second memory are only replaced by new values derived from said shape signals if the values derived from the shape signals are larger than the values of the coefficients already stored.

* * * * *

UNITED STATES PATENT AND TRADEMARK OFFICE
CERTIFICATE OF CORRECTION

PATENT NO. : 5,596,692
DATED : January 21, 1997
INVENTOR(S) : Philip D. Martin, Kenneth A. Woodhouse, Simon G. Shaw It is certified that error appears in the above-indentified patent and that said Letters Patent is hereby corrected as shown below:

In Col. 7, line 52, replace "1" with --l--.

In Col. 10, line 30, before "A'" insert --         --.

In Col. 10, line 32, before "B'" insert --         --.

In Col. 10, line 34, before "D'" insert --         --.

In Col. 10, line 45, replace "1" with --l--.

In Col. 11, line 56, after "to" delete "lo".

In Col. 12, line 5, after "204" insert --206,--.

In Col. 12, line 26, replace "1" with --l--.

In Col. 12, line 33, replace "1" with --l--.

In Col. 16, line 20, after "and" delete "10".

In Col. 22, line 1, after "in" insert --a--.

In Col. 23, line 2, replace "a" with --a)--.

In Col. 1, line 33, after "since" insert --a--.

In Col. 1, line 51, replace "reduces" with --reducing--.

In Col. 1, line 53, replace "appears" with --appear--.

In Col. 1, line 62, replace "patch," with --patch--.

In Col. 1, line 65, replace "truely" with --truly--.

UNITED STATES PATENT AND TRADEMARK OFFICE
CERTIFICATE OF CORRECTION

PATENT NO. : 5,596,692
DATED : January 21, 1997
INVENTOR(S) : Philip D. Martin, Kenneth A. Woodhouse, Simon G. Shaw It is certified that error appears in the above-indentified patent and that said Letters Patent is hereby corrected as shown below:

In Col. 3, line 10, after "utilised" insert --in--.

In Col. 10, line 55, replace "segement" with --segment--.

In Col. 10, line 60, replace "segement" with --segment--.

In Col. 12, line 41, replace "simultaneoulsy" with --simultaneously--.

In Col. 13, line 4, replace "texture," with --texture--.

In Col. 15, line 60, replace "P2 - P2" with --P2 - P1--.

In Col. 16, line 44, replace "Assuming," with --Assuming--.

In Col. 16, line 58, replace "transfered" with "transferred".

In Col. 16, line 61, replace "exsiting" with --existing--.

In Col. 17, line 37, replace "previousl" with --previously--.

Signed and Sealed this

Twenty-first Day of October 1997

Attest:

BRUCE LEHMAN

Attesting Officer

Commissioner of Patents and Trademarks